(12) United States Patent
Bigus

(10) Patent No.: US 6,671,691 B1
(45) Date of Patent: Dec. 30, 2003

(54) METHOD AND APPARATUS FOR EXPRESSION BUILDING EDITORS

(75) Inventor: Joseph Phillip Bigus, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/090,680

(22) Filed: Jun. 4, 1998

(51) Int. Cl.[7] .............................................. G06F 17/30
(52) U.S. Cl. ...................... 707/102; 707/100; 707/101; 345/700; 345/961
(58) Field of Search ................................. 345/340, 700, 345/961; 395/76; 707/102, 101, 100

(56) References Cited

U.S. PATENT DOCUMENTS 5,485,618 A * 1/1996 Smith .......................... 395/700
5,701,400 A * 12/1997 Amado ........................ 395/76
5,798,757 A * 8/1998 Smith .......................... 345/338

* cited by examiner

Primary Examiner—Frantz Coby
(74) Attorney, Agent, or Firm—Schmeiser, Olsen & Watts, LLP

(57) ABSTRACT

According to a preferred embodiment of the present invention, a method and an apparatus for a user-friendly expression builder GUI is disclosed. The preferred embodiment GUI design enables users to construct syntactically valid expressions, without any knowledge of expression syntax. The preferred embodiment provides generic expressions, which serve as starting points in expression building. Each generic expression is a syntactically correct expression containing generic parameters. The GUI user customizes the syntactically correct generic expression, by replacing the generic parameters with parameters specific to the database task at hand. The preferred embodiment provides lists of such specific parameters, including lists of field names and constants, which are selected to build the expression.

54 Claims, 28 Drawing Sheets

METHOD AND APPARATUS FOR EXPRESSION BUILDING EDITORS

BACKGROUND OF THE INVENTION

1. Technical Field

This invention generally relates to electrical computers and data processing and more specifically relates to graphical user interfaces.

2. Background Art

The development of the EDVAC computer system of 1948 is often cited as the beginning of the computer era. Since that time, computer systems have evolved into extremely sophisticated devices, and computer systems may be found in many different settings. Modern computer systems vary in their design and architecture, with many different models available to achieve the desired combination of speed, power, and efficiency for any given computing environment.

Computer systems typically include operating system software that controls the basic function of the computer, and one or more software applications that run under the control of the operating system to perform desired tasks. For example, an IBM mainframe computer may run the OS/390 operating system, and under the control of the operating system, a user may execute an application program, such as accounting software.

Computer software has evolved to take advantage of the higher performance of computer hardware. One popular software enhancement is the Graphical User Interface (GUI). Earlier generations of interactive user interfaces were not graphical; instead, users typed in commands onto the next available line of an otherwise blank computer screen. To perform any computer task using a command-line interface, users had to learn the precise syntax of each associated command. An example of a typical command-line interface is the DOS operating system. On the other hand, GUI users perform computer tasks with a simple point and click of a computer mouse on pull-down menus, buttons, scroll bars, and pictures called icons. Executing commands via point-and-click graphical tools eliminates the time consuming need to learn and manually-type in long, unfriendly commands.

Most computer programs now use GUI's, which provide the visual appeal of full-screen formatting. More important than looks, however, are the GUI's graphical tools, which facilitate the operation of computer software. As a result, non-technical people, who might have shied away from using computer applications in the generation of command-line interfaces, are more apt to use computer software equipped with GUI's. The benefits of a GUI, however, correlate to how well the GUI eliminates the need for users to learn and manually type in long, unfriendly commands.

For instance, some applications, despite having a GUI, still require users to learn and type in precise command syntax. Applications that allow users to retrieve information from databases are an example. The commands associated with database tasks are not easily performed using point-and-click graphical tools. Instead, a user must construct expressions which typically name database fields and values in those fields. Since field names and values vary with each database, GUI's cannot typically be programmed to perform database tasks with merely pointing and clicking. Thus, because the range of tasks that users perform on databases varies greatly, a GUI in itself does not eliminate the need for users to build expressions to perform database tasks.

Current designs for GUI's used to perform database tasks do eliminate some of the typing required to build expressions. Expression building using current GUI designs, however, requires that users know the syntax of the expression they are building. Without knowing function names, parameter lists, and syntax for conjunctively and disjunctively combining clauses, users of the current GUI designs cannot build the expressions necessary to perform database tasks.

Because current expression builder GUI designs provide no guidance in how to build expressions, users are not alerted about syntactical errors they might make while using the GUI. A user can spend significant time assembling a multi-lined, complex expression unaware of the extent to which it is valid, or invalid. After an expression has been formulated using current GUI designs, the underlying database software must check the validity of the expression by parsing the syntax. If parsing routines detect syntactical errors, then the user requested database task cannot be performed. This process can be frustrating for non-technical users.

Therefore, a disadvantage of the current expression builder GUI designs is that they require users to have knowledge of how to build a syntactically valid expression. If the user does not know precise syntax rules required for the database task they are trying to perform, the expression built using current GUI designs will likely be invalid. Another disadvantage of current expression builder designs is that they require the underlying software to parse the syntax of any expression built using the. GUI. This added programming requirement translates into higher industry costs.

Software that performs database tasks, using a GUI, can put critically important information at the fingertips of any computer user. Without a GUI design that allows users to build expressions, without needing to know anything about the syntactical requirements of the expressions they are building, fewer users will harness the powerful information available in data sources. As a result, many computer users who could greatly benefit from such information will not be able to perform the associated computer tasks themselves.

SUMMARY OF THE INVENTION

According to a preferred embodiment of the present invention, a method and an apparatus for a user-friendly expression builder GUI is disclosed. The preferred embodiment GUI design enables users to construct syntactically valid expressions, without any knowledge of expression syntax.

The preferred embodiment provides generic expressions, which serve as starting points in expression building. Each generic expression is a syntactically correct expression containing generic parameters. The GUI user customizes the syntactically correct generic expression, by replacing the generic parameters with parameters specific to the database task at hand. The preferred embodiment provides lists of such specific parameters, including lists of field names and constants, which are selected to build the expression.

The present invention eliminates the need to know the precise expression syntax rules associated with the computer tasks that users want to perform. Syntactically correct generic expressions are already constructed for the user. The present invention therefore provides a user-friendly expression builder GUI which is simple to understand and learn. The present invention also eliminates the need for the database software underlying the expression builder GUI to parse the syntax of expressions formulated using the GUI. Thus, the present invention simplifies the programming requirements associated with database software, which translates into lower industry costs.

What has been described in this summary, as well as other objects, features, and advantages of the invention will be apparent from the following more particular description of the preferred embodiments of the invention, as illustrated in the accompanying drawings.

BRIEF DESCRIPTION OF THE DRAWINGS

The preferred exemplary embodiments of the present invention will hereinafter be described in conjunction with the appended drawings, where like designations denote like elements, and.

BEST MODE FOR CARRYING OUT THE INVENTION

Figure 1:
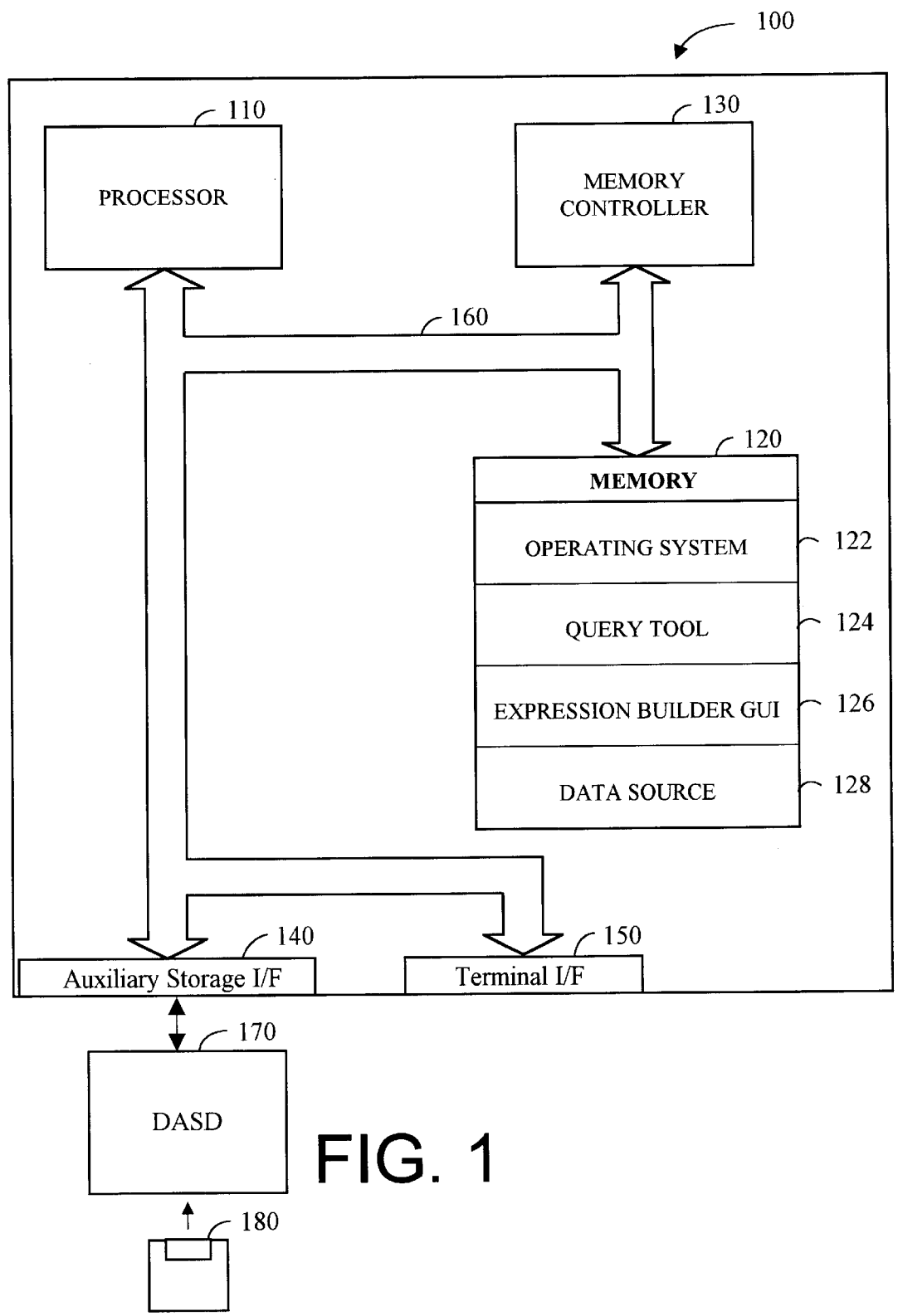
FIG. 1 is a block diagram of a computer system in accordance with a preferred embodiment of the present invention.

The present invention relates in general to an expression builder graphical user interface (GUI) design. More specifically, the present invention relates to building expressions for filtering database records and creating virtual fields. For those individuals who are not generally familiar with GUI's, database record filtration, and/or virtual field creation, the Overview section below presents many of the basic concepts and terminology that will help to understand the invention. Individuals skilled in the art of GUI's, database record filtration, and/or virtual field creation, may wish to skip this section and proceed directly to the Detailed Description section of this specification.

1. Overview

Graphical User Interfaces

Early computer programs required extensive knowledge of commands to perform any type of computer function. These computer programs employed what is known as a command line interface, in which a specific command would have to be entered to perform just about any type of computer task. This limited use of computers to those who had the time to learn a large number of relatively cryptic commands.

Computer systems now use a more advanced "user interface" to make it easier to perform functions without knowledge of specific commands. The most common user interface is the graphical user interface, or GUI. A GUI uses mechanisms, such as pull-down menus, buttons, scroll bars, and pictures called icons, which are activated with a pointing device, such as a mouse, or trackball. The graphical mechanisms are usually designed to be somewhat consistent and self-explanatory to make it as easy as possible for a user to execute commands.

One way GUI's facilitate the performance of computer functions is by alleviating the need to type in long and unfriendly commands. Instead of having to type in long commands, the user merely points and clicks on a graphical mechanism, displayed by the GUI, which equates to a command. Simple commands that are frequently performed, can be programmed so that all the GUI user has to do to perform the command is select a button. More complex commands, which require choices between options, can be programmed such that the user need only to click on a choice of options, and then select a button to execute a command.

Facilitating the execution of commands to the mere selecting of buttons eliminates the need for users to learn or type in precise command syntax. Instead, a GUI designed in this way, captures the user's selections and converts them into syntactically correct commands. Thus, with the popularity of GUI's, computer users are not needing to learn precise command syntax for many of the computer functions they perform.

Database Record Filtration

Industrial automation has brought with it masses of information stored electronically in data sources, such as databases or data files. Database retrieval software can put this critically important information at any computer user's fingertips. Retrieving database information requires that the software user specify, in expression terminology understandable to the software, what data to retrieve.

Database data is typically stored in units of information called "records." For instance, if the database is used to store payroll information, there might be a record for each pay period, or each work shift. The units of data in each database records are called "fields." The process of retrieving a specific subset of database records is known as "filtering-records." For instance, users might want to filter all records concerning the first work shift from a database containing payroll information. Filtering records from a database speeds up information request processing and provides data in manageable and intelligible subsets.

An expression that retrieves data from a database is known as a query. A query to filter records must be correctly formatted according to precise syntax rules in order for the database retrieval software to accurately process the request. A simple expression to filter records might consist of one clause, such as "shift=first," which would retrieve all database records having a value of "first" in the field named "shift."

Alternatively, a complex expression to filter records might have multiple clauses joined together with the boolean operators "AND," and "OR." For instance, the expression, "(shift=first)AND(payperiod>20)," retrieves database records which meet both the first and second requirements, because the clauses in the expression are connected with the boolean operator "AND." The records retrieved by this query have a value of "first" in the field named "shift," as well as a value greater than 20 in the field named "payperiod."

Virtual Field Creation

Another way that database software can put critically important information at any computer user's fingertips involves the creation of virtual fields. When a data source does not contain all the information necessary, users can create missing information in what is known as virtual fields. Instead of permanently storing the newly created information in the data source, virtual fields are stored separately, and temporarily. Thus, virtual fields reduce the storage requirements of data sources, and speed up the ability to utilize data source information, because the creation of new information is not limited to, or dependent upon the data source design itself A virtual field is created by a processing specification called a "computed function." Commonly employed computed functions create averages, or sums of database fields. Software that translates processing specifications into virtual fields, typically provides a number of standardized computed functions. A computed function expression consists of a data type, a function name, and a list of parameters enclosed in parentheses. The data type indicates the type of storage to reserve for the virtual field. The data type can be numeric, indicating that the virtual field will be a number on which arithmetic operations will take place. Alternatively, the data type can be "categorical," indicating that the virtual field will be a character string.

As an example, a computed function is used to create a virtual field, representing the average hours worked in a pay period, when this data is not on the payroll database. The expression might be built as follows: "numeric average (hours[1],hours[2],hours[3],hours[4],hours[5])." In this computed function, "numeric" is the data type, "average" is the function name, and "(hours[1],hours[2],hours[3],hours[4],hours[5])" is the list of parameters enclosed in parentheses. This processing specification directs the software to average five fields in an array named "hours," and to create a numeric virtual field in which to store this computation.

2. Detailed Description

The preferred embodiments according to the present invention are GUI's which facilitate the building of expressions. One preferred embodiment, the "Computed Function" expression builder GUI, facilitates the building of expressions to create virtual fields. A second preferred embodiment, the "Filter Records" expression builder GUI, facilitates the building of expressions to filter records from a data source. Both embodiments provide expression building guidance, such that the GUI user need not know the correct syntax for the commands associated with the computer tasks being performed.

The preferred embodiments facilitate expression building by providing users with syntactically correct generic expressions, which serve as starting points in expression building. Each generic expression is syntactically valid, with parameter place holders called generic arguments. The user customizes the generic expression, by selecting specific arguments to take the place of the generic arguments in the generic expression. The expression builder GUI provides the user with lists of such specific arguments, including lists of constants and lists of field names associated with a selected data source. The user points and clicks on the specific arguments from those lists to replace the generic arguments, thereby building a customized, syntactically correct expression.

Referring now to FIG. 1, a computer system 100 in accordance with a preferred embodiments of the present invention is illustrated. However, those skilled in the art will appreciate that the method and apparatus of the present invention apply equally to any computer system, regardless of whether the computer system is a complicated multi-user computing apparatus or a single user device such as a personal computer or workstation. Computer system 100 suitably comprises a processor 110, memory 120, a memory controller 130, an auxiliary storage interface 140, and a terminal interface 150, all of which are interconnected via a system bus 160. Note that various modifications, additions, or deletions may be made to computer system 100 illustrated in FIG. 1 within the scope of the, present invention such as the addition of cache memory or other peripheral devices. FIG. 1 is presented to simply illustrate some of the salient features of computer system 100.

Processor 110 performs computation and control functions of computer system 100, and comprises a suitable central processing unit (CPU). Processor 110 may comprise a single integrated circuit, such as a microprocessor, or may comprise any suitable number of integrated circuit devices and/or circuit boards working in cooperation to accomplish the functions of a processor. Processor 110 suitably executes an operating system 122, a query tool 124, an expression builder GUI 126, and a data source 128, within memory 120.

It should be understood that for purposes of this application, memory 120 is used in its broadest sense, and can include Dynamic Random Access Memory (DRAM), Static RAM (SRAM), flash memory, cache memory, swap file, etc. While not explicitly shown in FIG. 1, memory 120 may be a single type of memory component or maybe composed of many different types of memory components. For example, memory 120 and CPU 110 may be distributed across several different computers that collectively comprise system 100. It should also be understood that programs in memory 120 include any and all forms of computer programs, including source code, intermediate code, machine code, and any other representation of a computer program.

Query tool 124 provides a mechanism for retrieving and processing information from data source 128. Query tool 124 suitably executes expression builder GUI 126, which assists a user in building syntactically correct expressions to process information in data source 128. In the preferred embodiments of the present invention, expression builder GUI 126 is a Computed Function expression builder GUI, and a Filter Records expression builder GUI. The Computed Function expression builder GUI is used to create virtual fields in data source 128. The Filter Records expression builder GUI is used to retrieve subsets of records from data source 128. It should be noted that data source 128 could be a relational database, a sequential file, or any source of data, now existing or invented in the future.

Auxiliary storage interface 140 allows computer system 100 to store and retrieve information from auxiliary storage devices, such as magnetic disk (e.g., hard disks or floppy diskettes) or optical storage devices (e.g., CD-ROM). One suitable storage device is a direct access storage device (DASD) 170. As shown in FIG. 1, DASD 170 may be a floppy disk drive which may read programs and data from a floppy disk 180. It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include: recordable type media such as floppy disks (e.g., disk 180) and CD ROMS, and transmission type media such as digital and analog communication links, including wireless communication links.

Memory controller 130, through use of a processor is responsible for moving requested information from main memory 120 and/or through auxiliary storage interface 140 to processor 110. While for the purposes of explanation, memory controller 130 is shown as a separate entity, those skilled in the art understand that, in practice, portions of the function provided by memory controller 130 may actually reside in the circuitry associated with processor 110, main memory 120, and/or auxiliary storage interface 140.

Terminal interface 150 allows system administrators and computer programmers to communicate with computer system 100, normally through programmable workstations. Although the system 100 depicted in FIG. 1 contains only a single main processor 110 and a single system bus 160, it should be understood that the present invention applies equally to computer systems having multiple processors and multiple system buses. Similarly, although the system bus 160, of the preferred embodiment is a typical hardwired, multidrop bus, any connection means that supports-directional communication in a computer-related environment could be used.

The first of two preferred embodiments of the present invention is an expression builder GUI which allows the user to create virtual fields in data source 128. Utilizing query tool 124, the user selects data source 128. Data source 128 is suitably a relational database, but can be any source of data, now existing or invented in the future. Query tool 124 also gives the user the option to invoke the "Computed Function" expression builder GUI 126 to facilitate the building of a valid processing specification to create a virtual field in data source 128.

Figure 2:
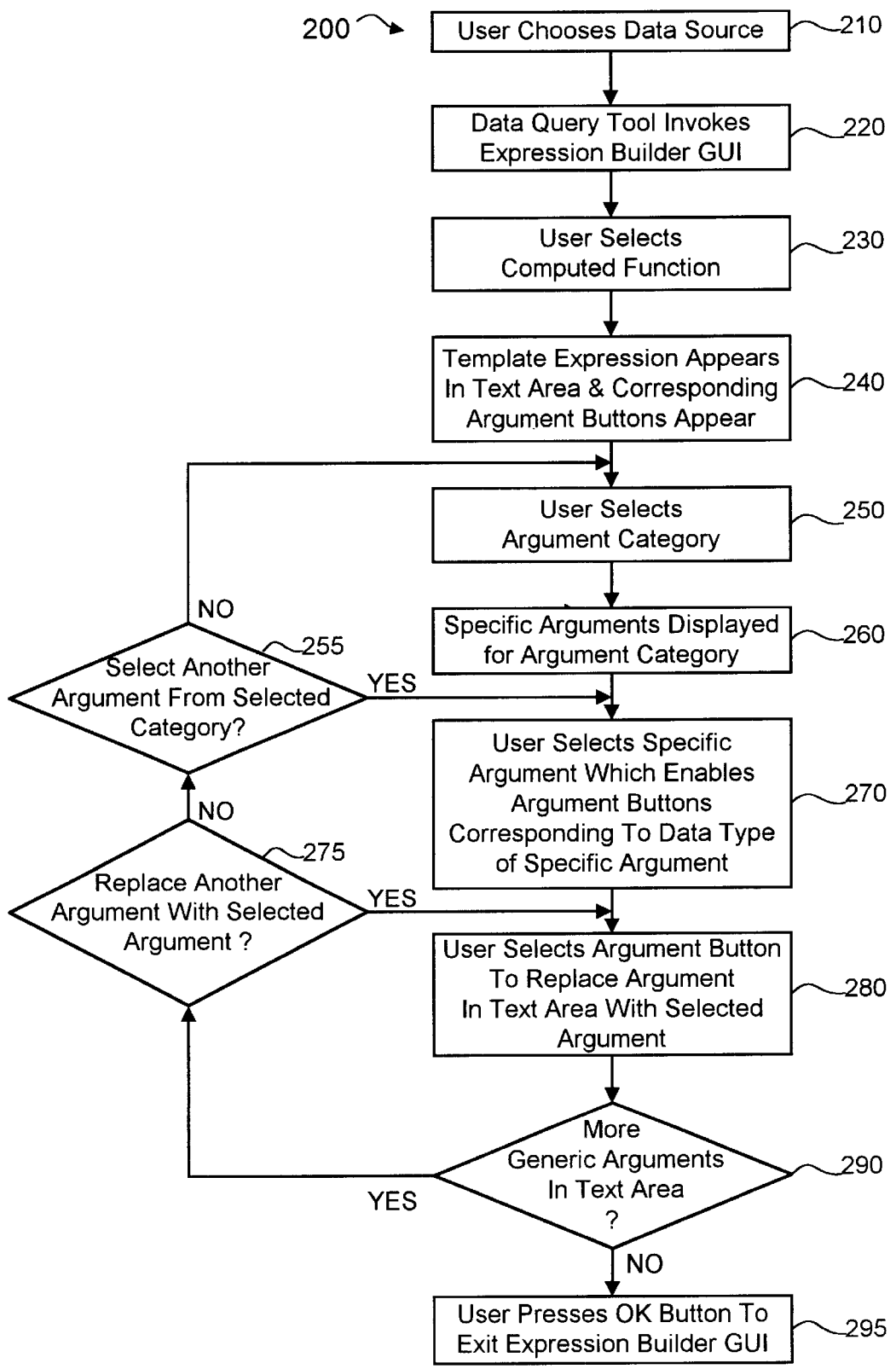
FIG. 2 is a flowchart depicting the method used to build expressions for Computed Functions according to the preferred embodiments of the present invention.

Referring now to FIG. 2, a flowchart of the method according the first of two preferred embodiments of the present invention, by which a user creates virtual fields in data source 128 is disclosed. In step 210, the user chooses data source 128. In step 220, the user chooses to create a virtual field in data source 128, which prompts data query tool 124 to invoke the Computed Function expression builder GUI.

Figure 3:
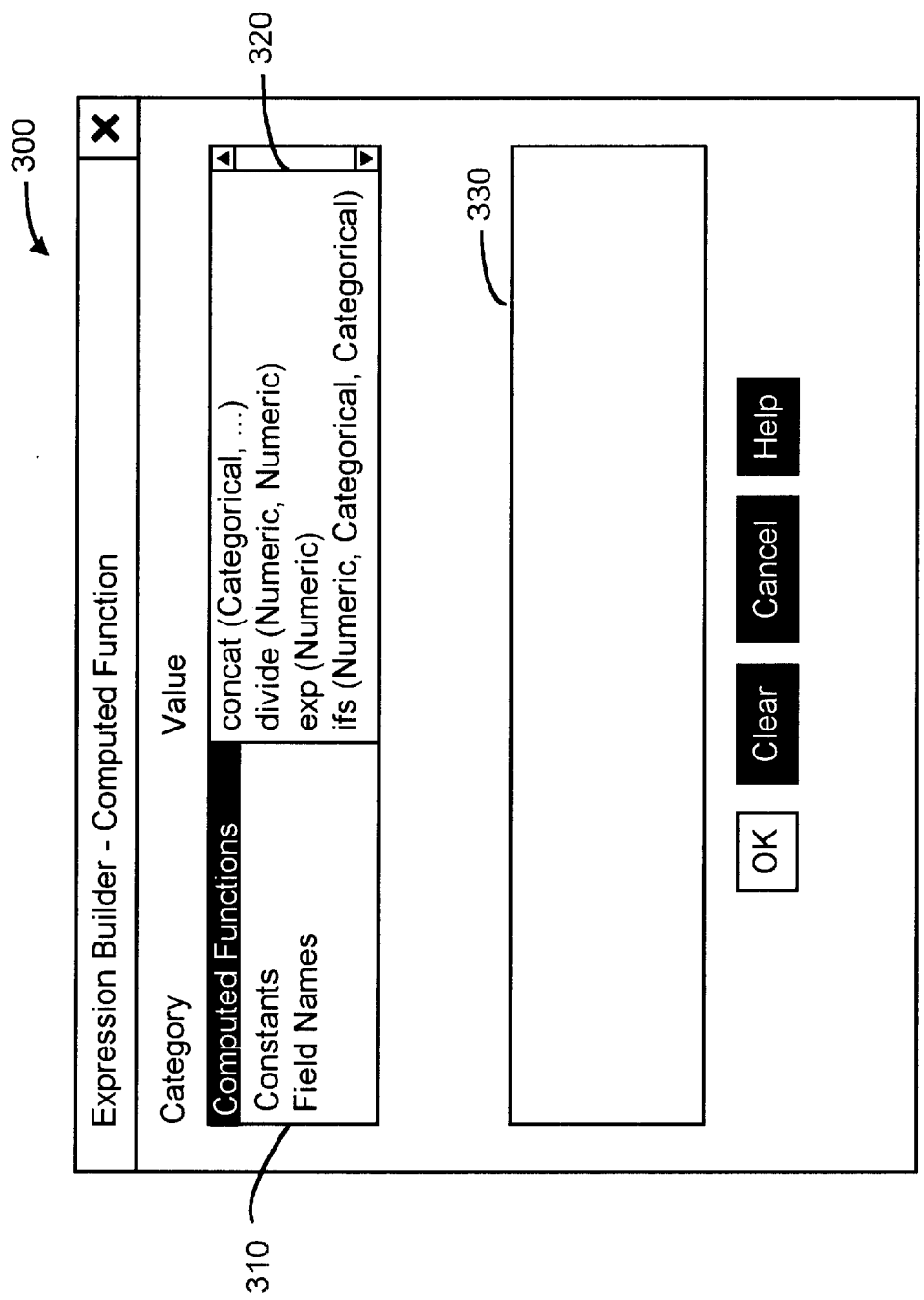
FIG. 3 depicts a screen print, illustrating how the preferred Computed Function Expression Builder GUI initially appears when the data query tool invokes it.

Referring now to FIG. 3, a screen print 300, illustrating a preferred GUI of a Computed Function expression builder in accordance with the preferred embodiments of the present invention is depicted. Screen print 300 portrays the GUI as, it first appears, to the user when the underlying application, the query tool, invokes it. The GUI is initialized to display a list of available computed functions, as illustrated by the highlighted Computed Functions category in window 310, and the corresponding list of generic functions in window 320.

It should be noted that the list of computed functions in window 320 contain generic arguments, each which has an associated data type. The data type can be either numeric or categorical. A numeric data type indicates that syntax rules require the associated generic argument to be a number. A categorical data type indicates that the syntax rules require the associated generic argument to be a string constant. The generic arguments indicate their associated data types to the GUI user. For instance, the generic parameter will have a value of "Numeric" if the user must replace it with a number. On the other hand, the generic argument will have a value of "Categorical" if the user must replace it with a character string.

Those skilled in the art will understand that the data types of categorical and numeric refer to how the computer stores the information. Non-numeric information cannot be stored in computer fields of a numeric data type. On the other hand, numeric information can be stored in a categorical, or character string field; however, storing numeric information is stored in a non-numeric field limits the arithmetic operations that can be performed on that field. Thus, numbers are mostly stored in numeric fields and non-numeric information is always stored in non-numeric fields.

For the purposes of illustrating the operation of the preferred embodiments of the present invention, some fields and buttons are drawn white and some are drawn black. Fields drawn in black have been "selected," either by the GUI or by the user. Buttons drawn in black have been "activated," in one of two ways. First, the GUI activates some buttons for the entire time that the GUI is active. Second, the GUI may activate a button in response to choices made by the user during the building of an expression. Those skilled in the art will recognize that selected fields and activated buttons can be differentiated from unselected fields and de-activated buttons in many ways, including changes of color, texture, brightness, etc.)

As the expression builder GUI initially appears to the user, the computed functions category has been selected by the GUI, and thus is illustrated in black. The GUI is initialized to select the computed functions category to facilitate expression building, since the first step to building a computed function expression is for the user to select a computed function. Whenever any category in window 310 is selected, either by the GUI or by the user, a list of the components of that category are displayed in window 320. Since the computed functions category is selected in FIG. 3, the list of available computed functions, or generic expressions are displayed in window 320.

The expression builder GUI is also initialized with the Clear, Cancel, and Help buttons activated. Thus, these buttons are illustrated in black. Any time a buttons are activated, the GUI user can select it to perform a GUI function. On the other hand, the GUI does not activate the OK button initially; thus, it is illustrated in white. When a button field is inactive, no functions will be performed if the user selects that button.

In operating the expression builder GUI, the user makes the selections by pointing to fields and buttons and clicking on them with a mouse, trackball, or other pointing mechanism. Selecting a field highlights it the user's screen. The selected fields are drawn in black. Selecting an active (black) button performs the corresponding GUI function. On the other hand, selecting an inactive button has no effect, other than possibly to display an error message to explain to the user why no function has been performed. Those skilled in the art will understand that any means of user selection and activation of fields can be used, and further that a selected fields and activated buttons can be highlighted in any way (change of color, texture, brightness, etc.).

Text area window 330, where the user will build an expression, is initially blank. The only buttons that appear on the initial computed function expression builder GUI, as depicted by screen print 300 are the OK, Clear, Cancel, and Help buttons. The OK button is not initially enabled, and thus is illustrated as a white button. It will remain disabled until a complete expression has been constructed text area 310. A complete expression is one in which the user has replaced all generic arguments with specific arguments. The remaining three buttons are initially enabled and thus, are depicted in black. The user may select any enabled button to activate the function denoted by the button.

The Clear button re-initializes the Computed Function expression builder GUI. The user may choose to select the Clear button if the wrong computed function was selected. After selecting the Clear button, the Computed Function expression builder will reset itself to look exactly as it does in screen print 300.

The Cancel button returns control to the query tool that invoked the Computed Function expression builder. Pressing Cancel relinquishes control without passing any expression that might be partially or totally constructed in text area 330.

The Help button invokes a separate GUI to provide the user with instructions and assistance in operating the Computed Function expression builder GUI. Those skilled in the art understand that selecting the Help button could also provide instruction with other programs that are operating simultaneously to the Computed Function expression builder, such as the query tool, or the operating system.

Referring back to FIG. 2, step 230, the user selects a computed function, or generic expression from the displayed list. In the preferred embodiment, the selection takes place when the user points to a function and clicks on it. Clicking on a function results with step 240, in which a template of the selected generic expression is copied to the text area of the GUI. When the computed function is copied to the text area, a number of argument selectors are enabled on the GUI. Since different computed functions require different numbers of arguments, a number of argument buttons corresponding to the number in the chosen function appear on the GUI when template is copied.

Figure 4:
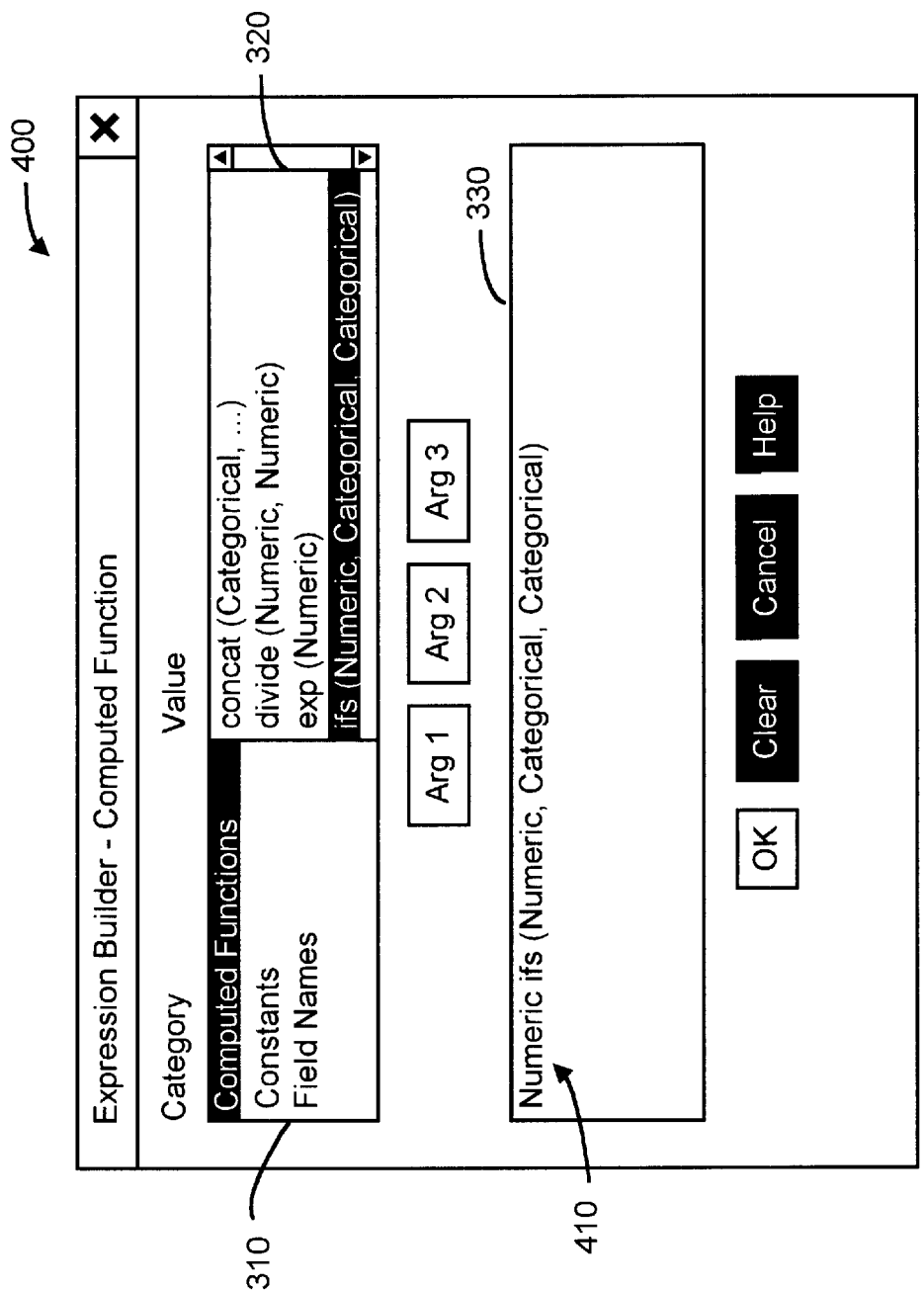
FIG. 4 depicts a screen print, illustrating the preferred Computed Function Expression Builder GUI when the user selects a particular computed function in the Value Box.

Referring now to FIG. 4, a second screen print 400, illustrating a preferred GUI of a Computed Function expression builder in accordance with the preferred embodiments of the present invention is depicted. This screen print illustrates how the GUI appears after the user has selected the "ifs" computed function from the list in window 320. A template of the "ifs" function is copied to text area 330. The template contains 3 generic arguments denoted by the words Numeric, Categorical, and Categorical. The template expression is also preceded by data type 410 which identifies what kind of data storage should be reserved for the new virtual field. In this example, data type 410 is Numeric. In the preferred embodiment of the invention, the data type which precedes the expression template is not alterable by the user; instead, it is predefined for each available function in window 320.

Three argument selectors appear on the screen when the "ifs" expression template is copied to text area 330. In the illustrated embodiment, the argument selectors take the form of buttons, but other mechanisms could be used. These argument buttons correspond to the 3 generic arguments in the template expression: Numeric, Categorical, and Categorical. These argument buttons, "Arg 1," "Arg 2," and "Arg 3," initially appear as white buttons because they are not enabled. In the preferred embodiment, they will not become enabled until a specific argument has been selected whose associated data type matches that of the corresponding generic argument.

Referring back to FIG. 2, step 250, once a template expression exists in text area, the user can begin selecting specific arguments to replace the generic ones in the template. To replace a generic argument, the user must first select an argument category. The available categories are Constants and Field Names. Once the user selects a category, step 260 displays a list of available specific arguments for the selected category.

Figure 5:
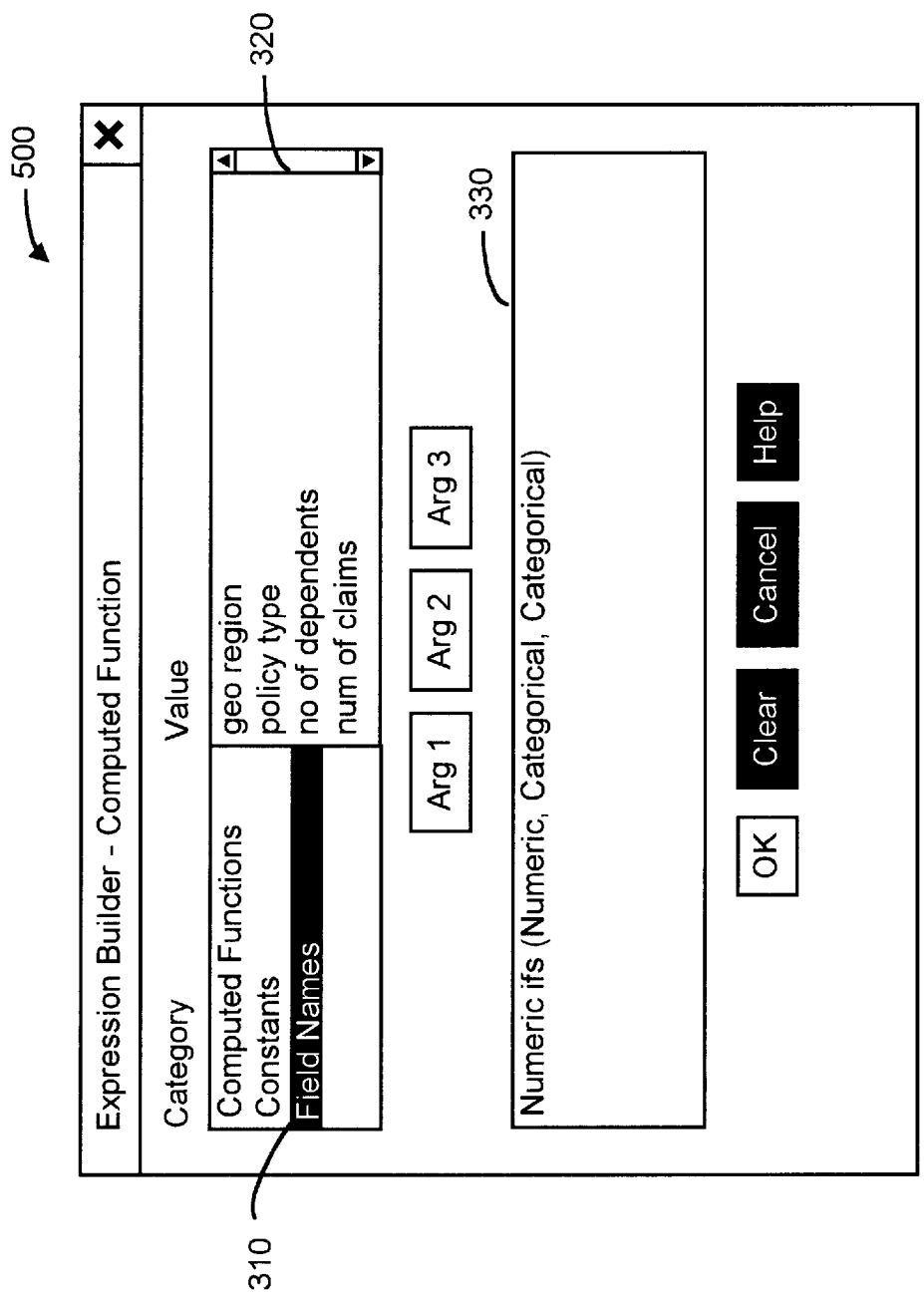
FIG. 5 depicts a screen print, illustrating the preferred Computed Function Expression Builder GUI when the user selects the Field Names category.

Referring now to FIG. 5, a third screen print 500, illustrating a preferred GUI of a Computed Function expression builder in accordance with the preferred embodiments of the present invention is depicted. In this example, the user has selected the Field Names category in window 310. A list of field names corresponding to fields in the data source appears in window 320. Field names are "available" if they are existing fields in the data source, or associated with it, like in the case of existing virtual fields.

Referring back to FIG. 2, step 270, the user selects a field name from the list. Each field name has a corresponding data type, meaning it is stored electronically as either a numeric field or as a character string (categorical). Although the data type for each field name listed is not displayed, the expression builder GUI does indicate the data type of a specific argument. The indication is given when the user selects a specific argument.

The indicator of whether that specific argument is numeric or categorical is the activation or deactivation of the argument buttons associated with the generic arguments in the template expression. When the selected specific argument's data type matches that of a generic argument, the corresponding argument button becomes enabled. On the other hand, when the data types do not match, the corresponding argument button is disabled.

Figure 6:
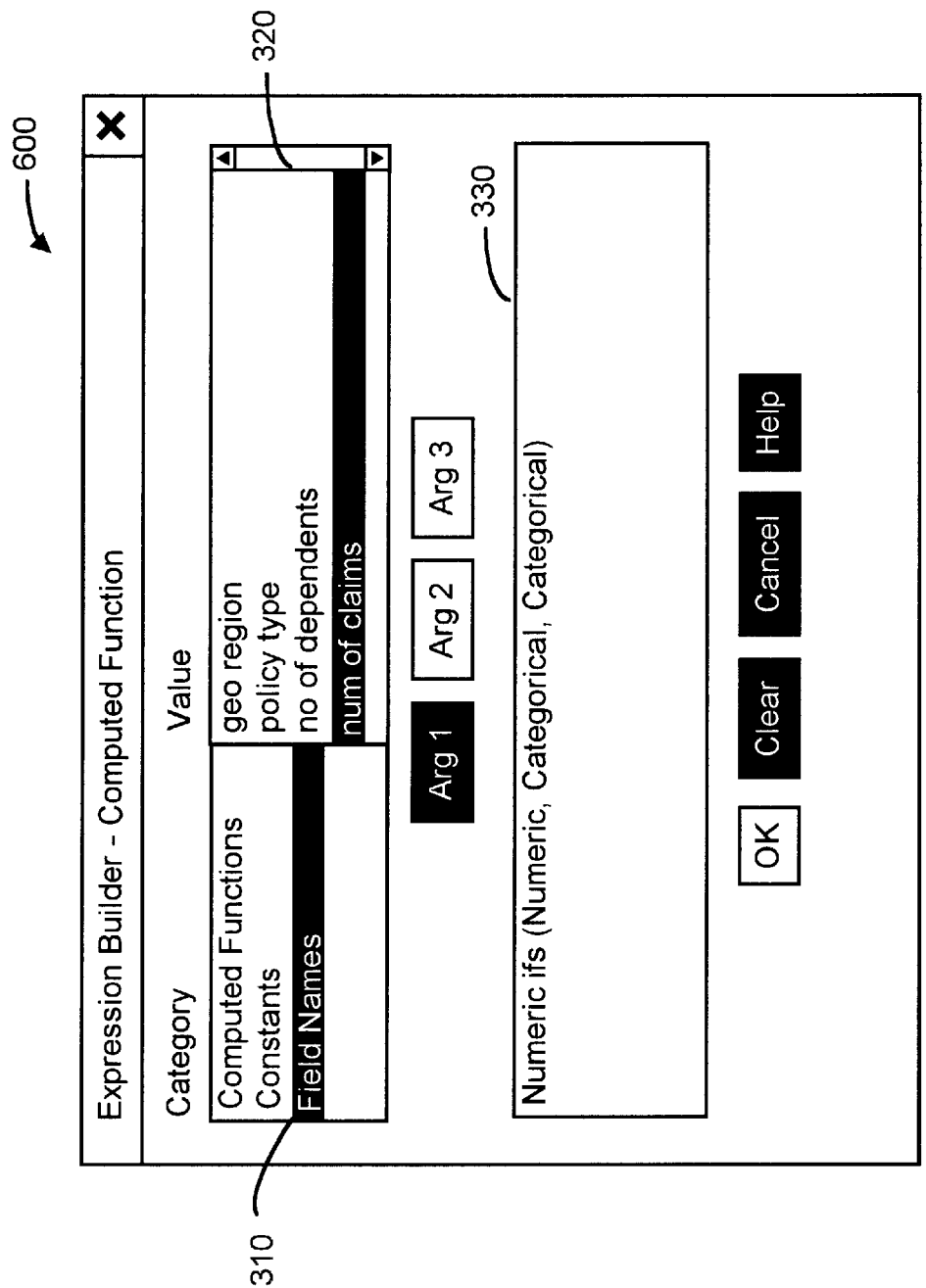
FIG. 6 depicts a screen print, illustrating the preferred Computed Function Expression Builder GUI when the user selects a numeric data type Field Name from the list of specific arguments.

Referring now to FIG. 6, a fourth screen print 600, illustrating a preferred GUI of a Computed Function expression builder in accordance with the preferred embodiments of the present invention is depicted. The user selects the "num of claims" field from the list of field names in window 320, and the "Arg 1" button is enabled (turns black). Argument buttons only become enabled when the user has selected a specific argument of the same data type as the generic argument in the template in text area 330. In this example, "num of claims" has a numeric data type. The template expression in text area 330 contains one generic argument that requires a numeric data type, that is the first generic argument. Since the "Arg 1" button corresponds to the first generic argument, it becomes enabled.

The activation and deactivation of argument buttons corresponds to the data types of the field names selected from the listing window 320. Therefore, the user can tell the data type of a field name by selecting it from the list in window 320. Every time a different field name is selected, the argument buttons may or may not change corresponding to whether the data type of the field names changes as well. In this example, only one argument button is activated, since only one generic argument in the template expression in text area 330 is numeric. If more generic arguments were numeric in the template expression, a button for each numeric generic argument would be enabled upon selecting a numeric specific argument. The activation and deactivation of argument buttons prevents users from replacing generic arguments with specific arguments of the wrong data type. In this way, the present invention prevents the user from constructing invalid expressions.

Referring back to FIG. 2, step 280, the user can select any enabled argument button to replace a generic argument in the text area with the selected specific argument. By replacing the generic arguments with specific arguments, the template expression becomes customized into a powerful processing specification, which when executed, will create a virtual field in data source 128.

Figure 7:
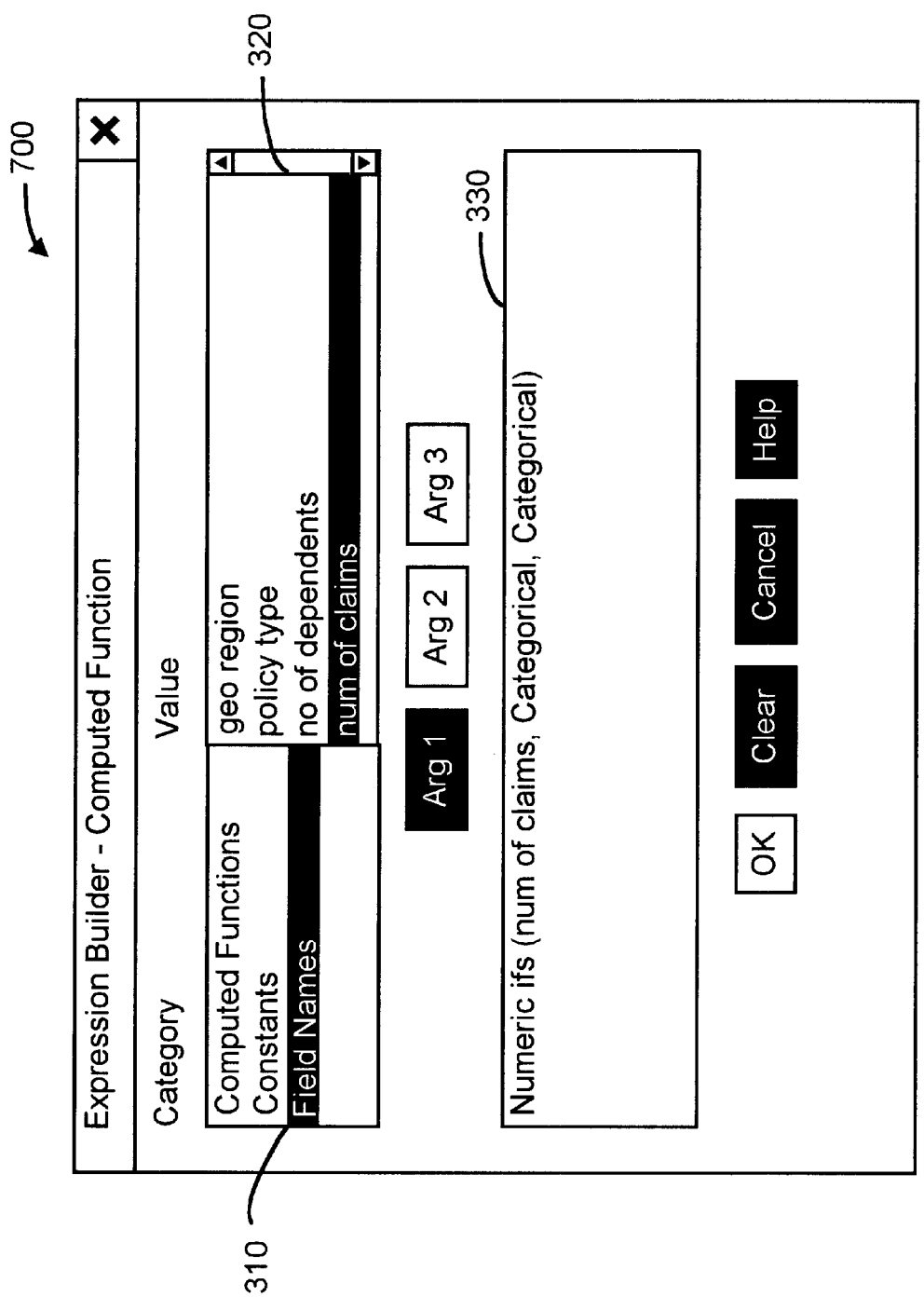
FIG. 7 depicts a screen print, illustrating the preferred Computed Function Expression Builder GUI when the user selects the Argument 1 button.

Referring now to FIG. 7, a fifth screen print 700, illustrating a preferred GUI of a Computed Function expression builder in accordance with the preferred embodiments of the present invention is depicted. When the user selects the "Arg 1" button, the selected specific argument replaces the first argument in the selected function.

Referring back to FIG. 2, step 290, when generic arguments remain in the template expression in text area 330, those generic arguments have yet to be replaced with specific arguments, and thus the user repeats steps in method 200. The user has three options, in addition to selecting the Clear, Cancel, or Help buttons. The first option, steps 275 and 280, is to replace another generic argument in the template expression with the same specific argument that is currently selected in window 320. A second option, steps 255 and 270, is to select a different specific argument from the list in window 320. The third option, step 250, is to select a different category of specific arguments. The second option of selecting a different specific argument from the same category is illustrated by FIGS. 8 and 9.

Figure 8:
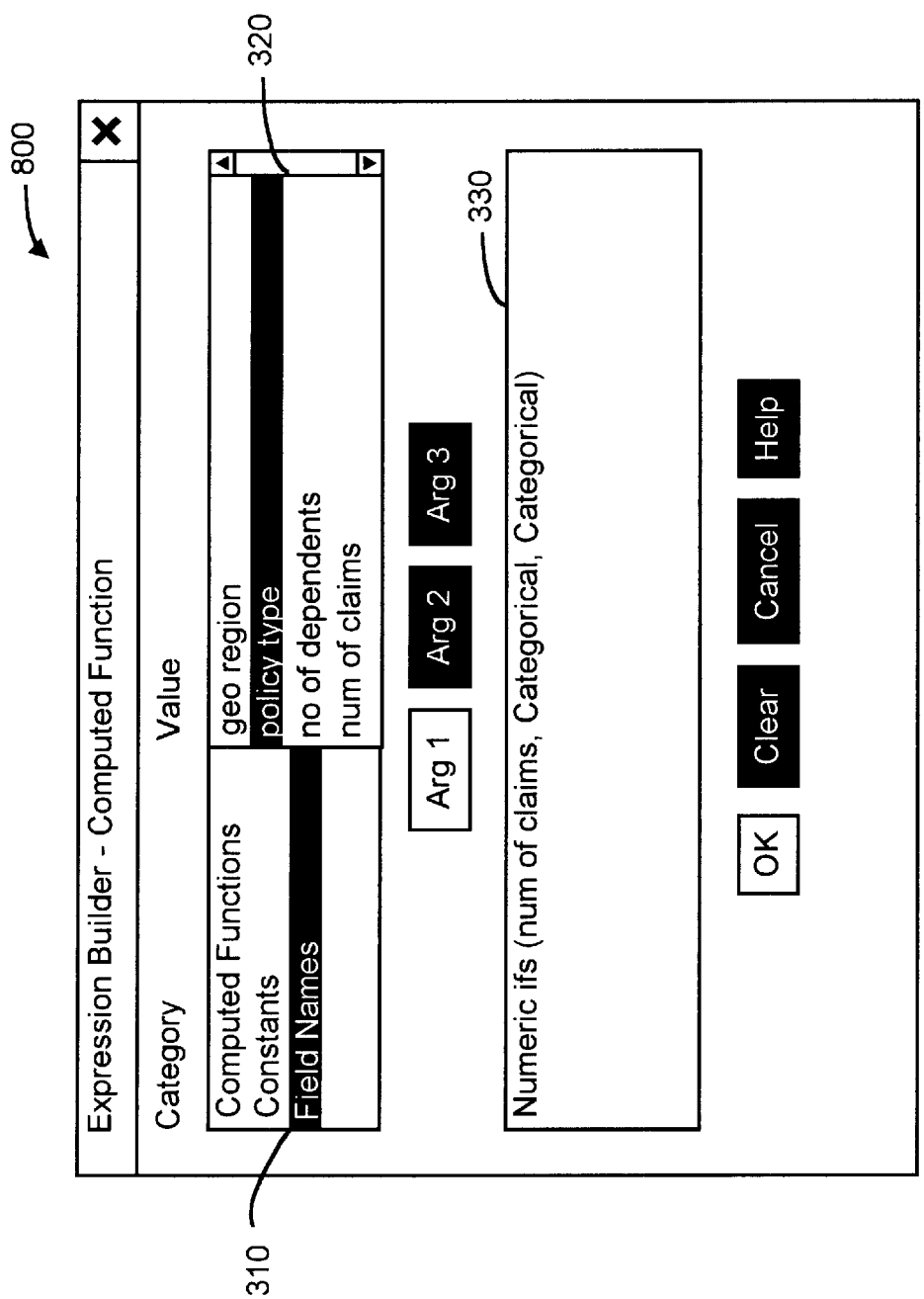
FIG. 8 depicts a screen print, illustrating the preferred Computed Function Expression Builder GUI when the user selects a categorical field name from the Value list.

Referring now to FIG. 8, a sixth screen print 800, illustrating a preferred GUI of a Computed Function expression builder in accordance with the preferred embodiments of the present invention is depicted. When the user selects a specific argument from the list in window 230, which has a categorical data type, the argument buttons which correspond to categorical arguments in the template expression are the only argument buttons enabled. In this example, the user selected the "policy type" field name. Since "policy type" has a categorical data type, "Arg 2" and "Arg 3" buttons are enabled, because they correspond to the categorical generic arguments in the template expression in text area 330.

Figure 9:
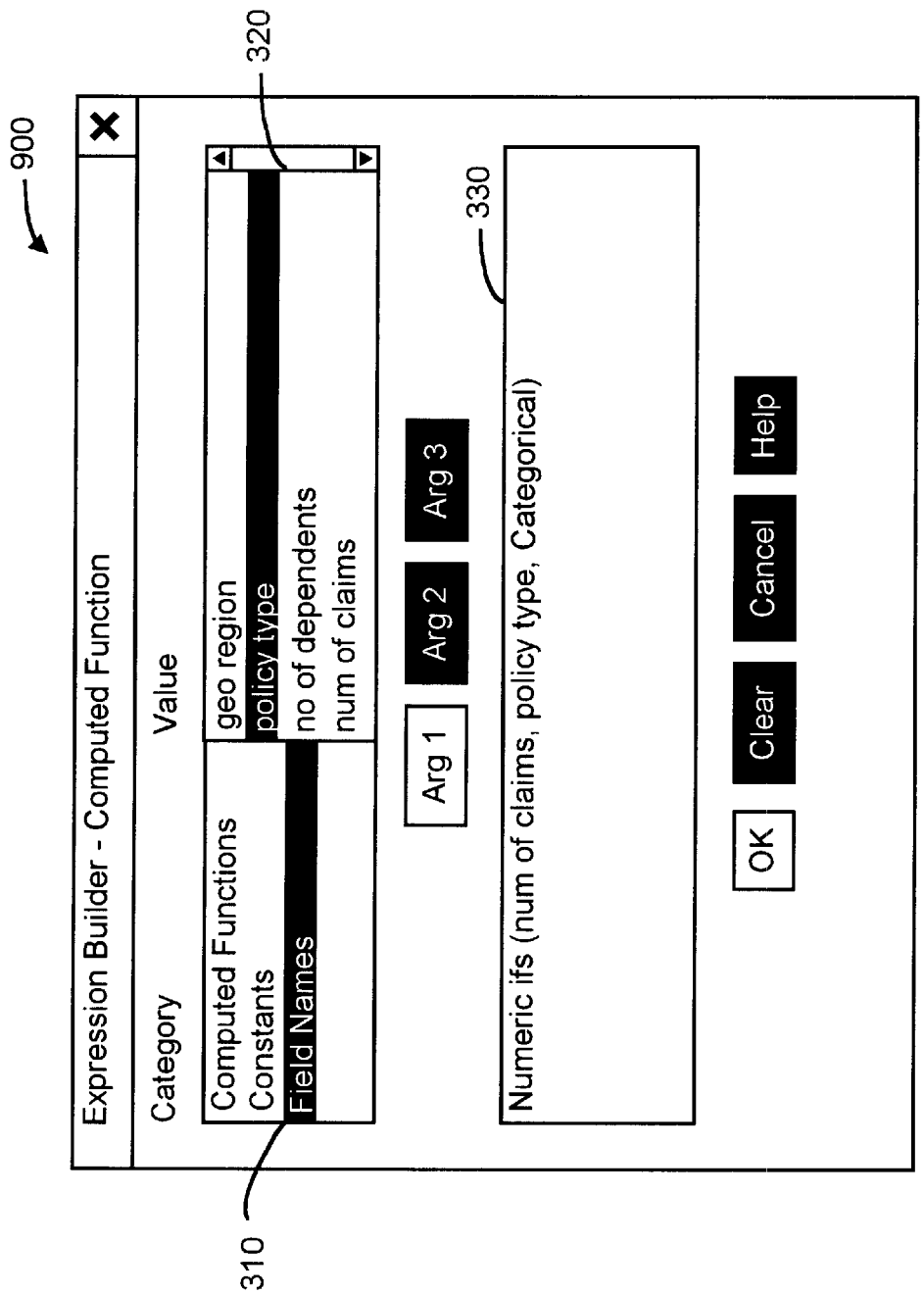
FIG. 9 depicts a screen print, illustrating the preferred Computed Function Expression Builder GUI when the user selects the Arg 2 button.

Referring now to FIG. 9, a seventh screen print 900, illustrating a preferred GUI of a Computed Function expression builder in accordance with the preferred embodiments of the present invention is depicted. When the user selects the "Arg 2" button, "policy type" replaces the second argument in the template expression in text area 330.

Figure 10:
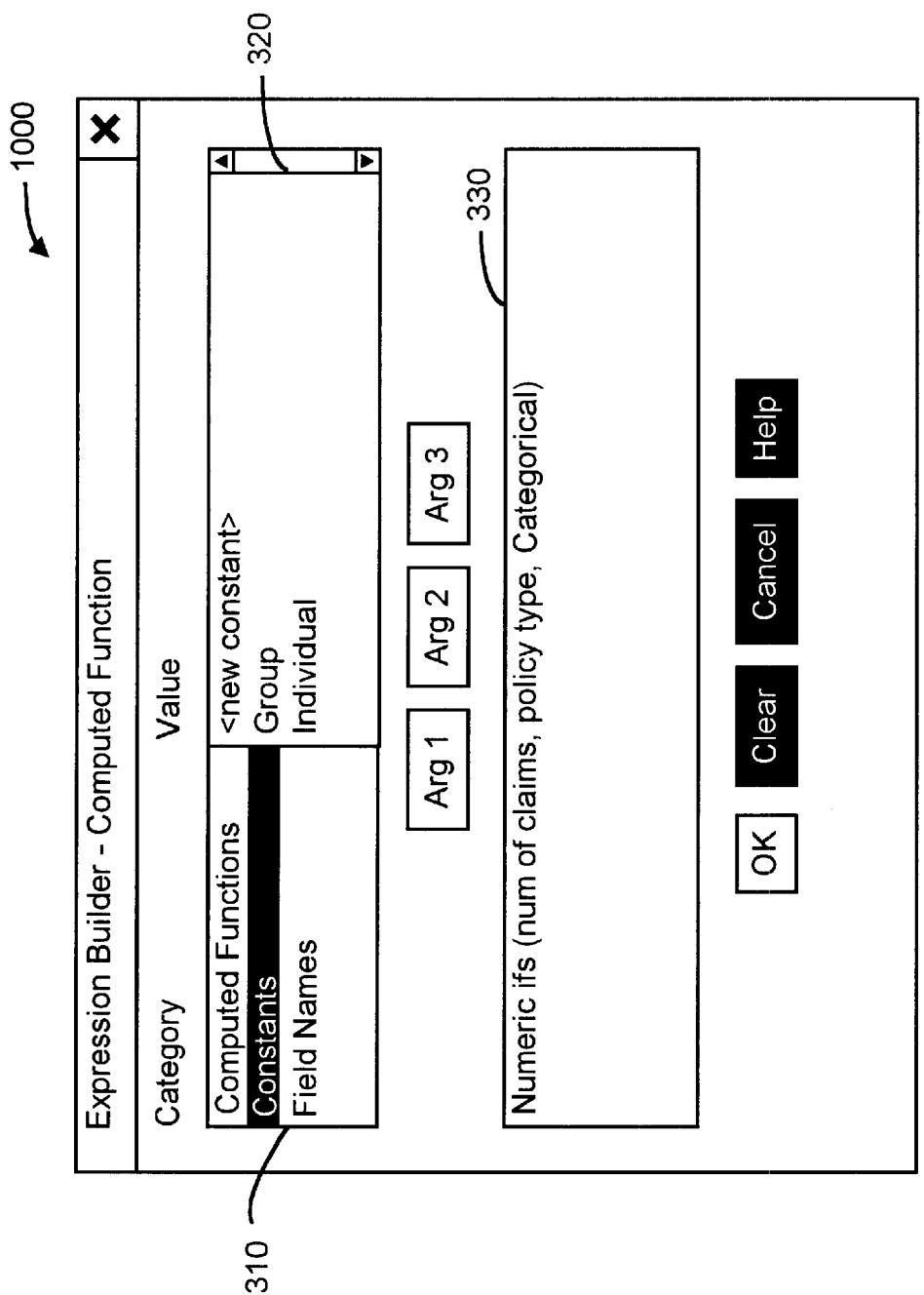
FIG. 10 depicts a screen print, illustrating the preferred Computed Function Expression Builder GUI when the user selects the Constants category.
Figure 11:
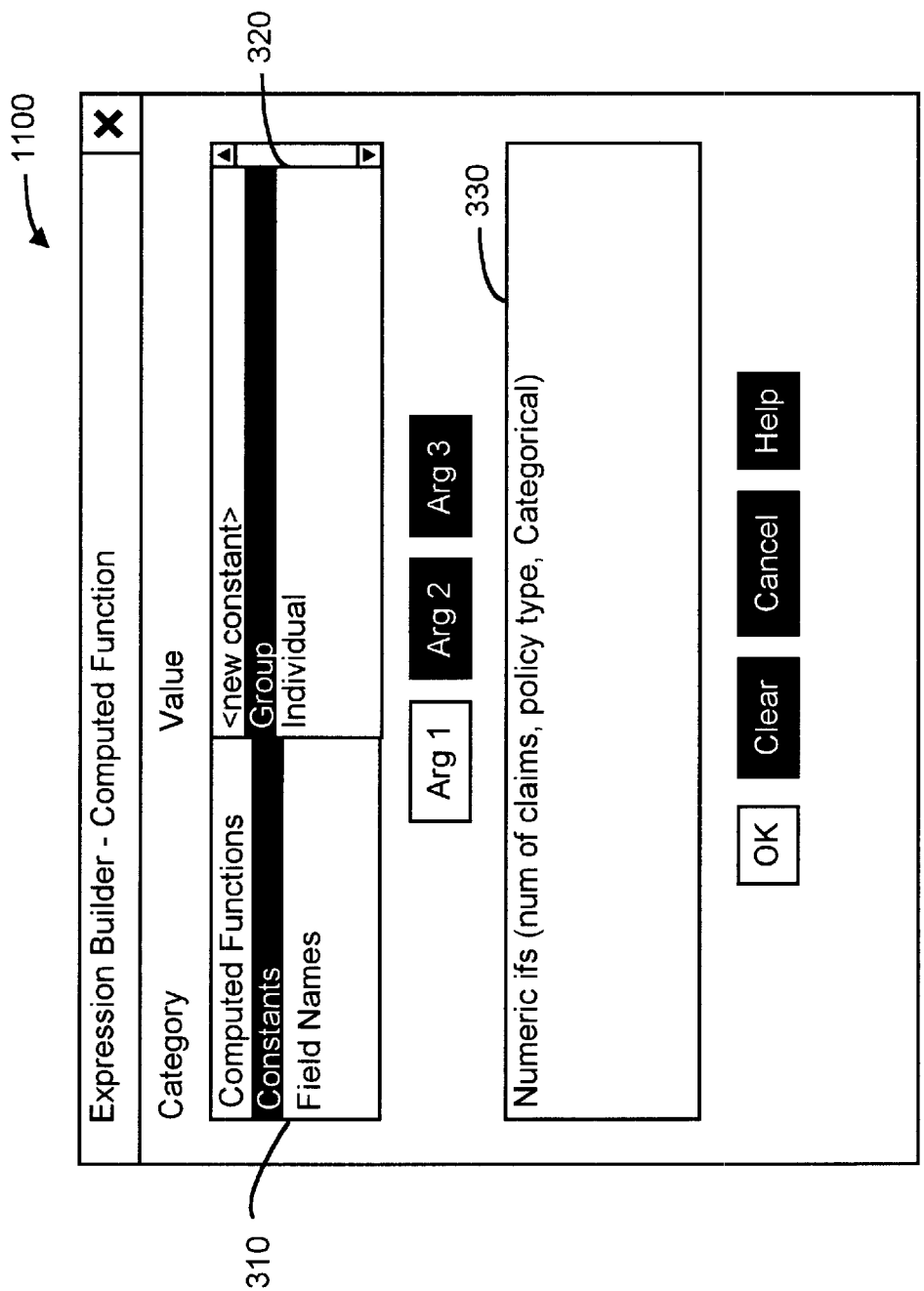
FIG. 11 depicts a screen print, illustrating the preferred Computed Function Expression Builder GUI when the user selects a categorical constant.
Figure 12:
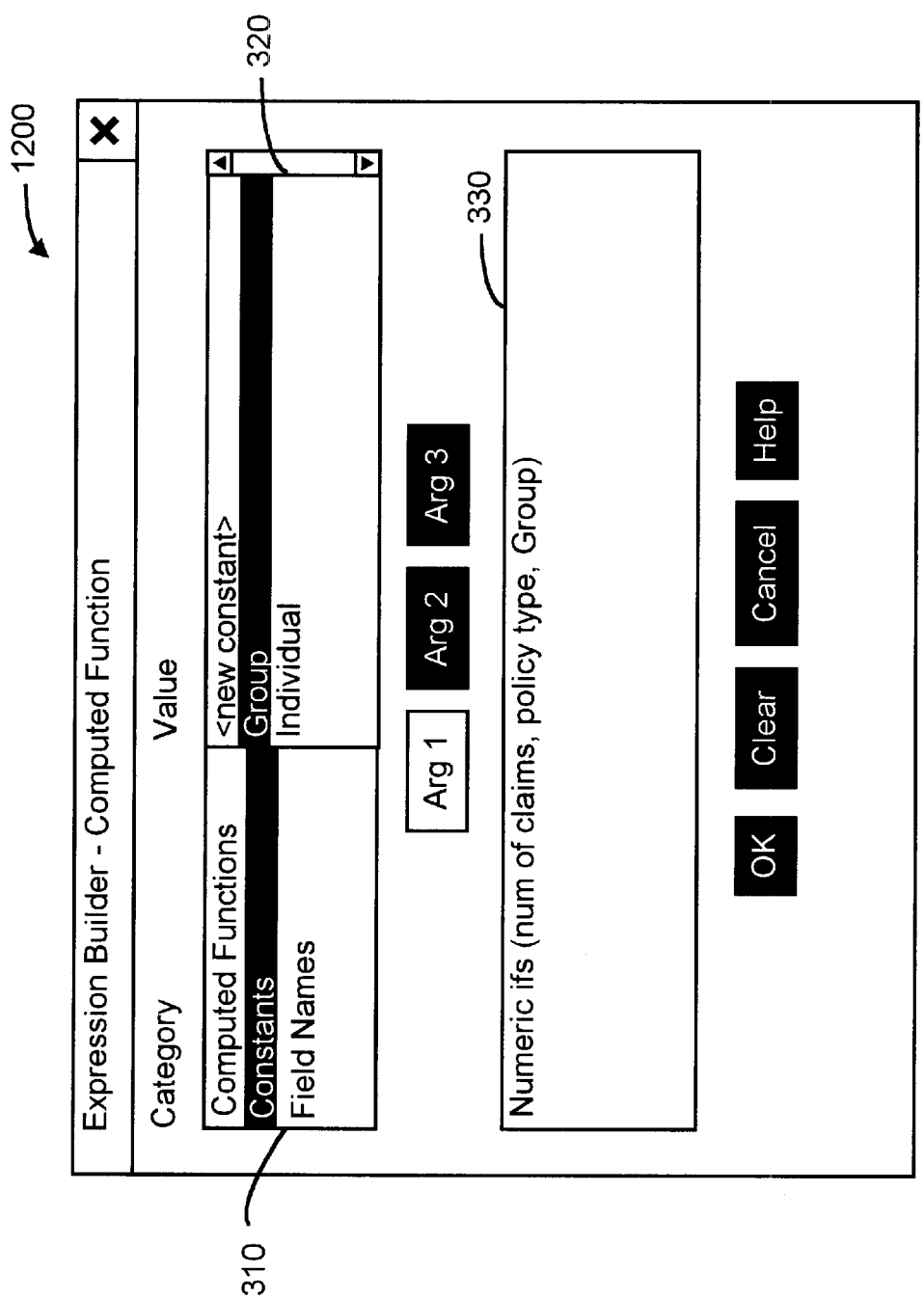
FIG. 12 depicts a screen print, illustrating the preferred Computed Function Expression Builder GUI when the user selects the argument button for the last remaining generic argument in the Computed Function definition.

Referring back to FIG. 2, step 290, the third option of repeating steps 250 through 280 is illustrated by FIGS. 10 through 12.

Referring now to FIG. 10, an eighth screen print 1000, illustrating a preferred GUI of a Computed Function expression builder in accordance with the preferred embodiments of the present invention is depicted. When the user selects the Constants category, available constants are displayed in the specific argument list in window 320. If no constants have been defined yet, window 320 will display only <new constant>, which is a specific argument that works differently from all other specific arguments in the expression builder GUI.

Unlike other specific arguments, the <new constant> specific argument cannot itself, replace generic arguments in the template expression in text area 330. Instead, a user double-clicks on the <new constant> specific argument to define new constants. Double-clicking on <new constant> changes it into a text entry field, in which the user can type any new constant. The particular value typed in by the user, is then appended to the end of the specific argument list of constants displayed in window 320. Once a user defines a new constant, that constant continue to be available while the data query tool that invoked the Computed Function expression builder GUI is in use. In the example illustrated by FIG. 10, the list of available constants comprises two, "Group," and "Individual," as well as the <new constant> data entry field.

Referring now to FIG. 11, a ninth screen print 1100, illustrating a preferred GUI of a Computed Function expression builder in accordance with the preferred embodiments of the present invention is depicted. The user selects "Group" from the list of available constants in window 320. Since "Group" is a categorical constant, "Arg 2" and "Arg 3" buttons become enabled because they correspond to categorical arguments in the template expression in text area 330. Argument buttons are activated and deactivated in correspondence to the data types of the specific arguments selected from the list in window 320. Every time a different specific argument is selected, the argument buttons may or may not change corresponding to whether the data type of the constant changes as well. Therefore, the activation and deactivation of argument buttons prevents users from replacing generic arguments with specific arguments of the wrong data type. In this way, the present invention prevents the user from constructing invalid expressions.

Referring now to FIG. 12, a tenth screen print 1200, illustrating a preferred GUI of a Computed Function expression builder in accordance with the preferred embodiments of the present invention is depicted. When the user selects the "Arg 3" button, the selected specific argument, "Group," replaces the third argument in the selected function.

It should be noted that argument buttons do not need to be selected in any specific sequence. The user can select an enabled argument button even though it has been selected before. The effect of re-selecting an argument button is to replace the corresponding specific argument in the template expression with a newly selected specific argument.

In the example illustrated in FIGS. 3 through 12, the user has used method 200 to build a valid Computed Function expression. Referring still to FIG. 12, the selected function in text area 330 now has had all its generic arguments replaced with specific arguments. When the Computed Function expression builder GUI detects that no more generic arguments remain in the template expression, the GUI enables the OK button. Referring back to FIG. 200, step 295, when the user selects the OK button, control is returned to data query tool 124, along with the complete expression in text area 330. The data query tool then executes the processing specification to create a new virtual field.

Using method 200, a user can build a syntactically correct expression, even when the user is not familiar with the syntax necessary for computed functions. The methods of the present invention provide the user with generic expressions, and allow the user to replace generic arguments only with specific arguments which correspond in data type. In this way, the Computed Function expression builder GUI facilitates the building of syntactically correct processing specifications.

Figure 13:
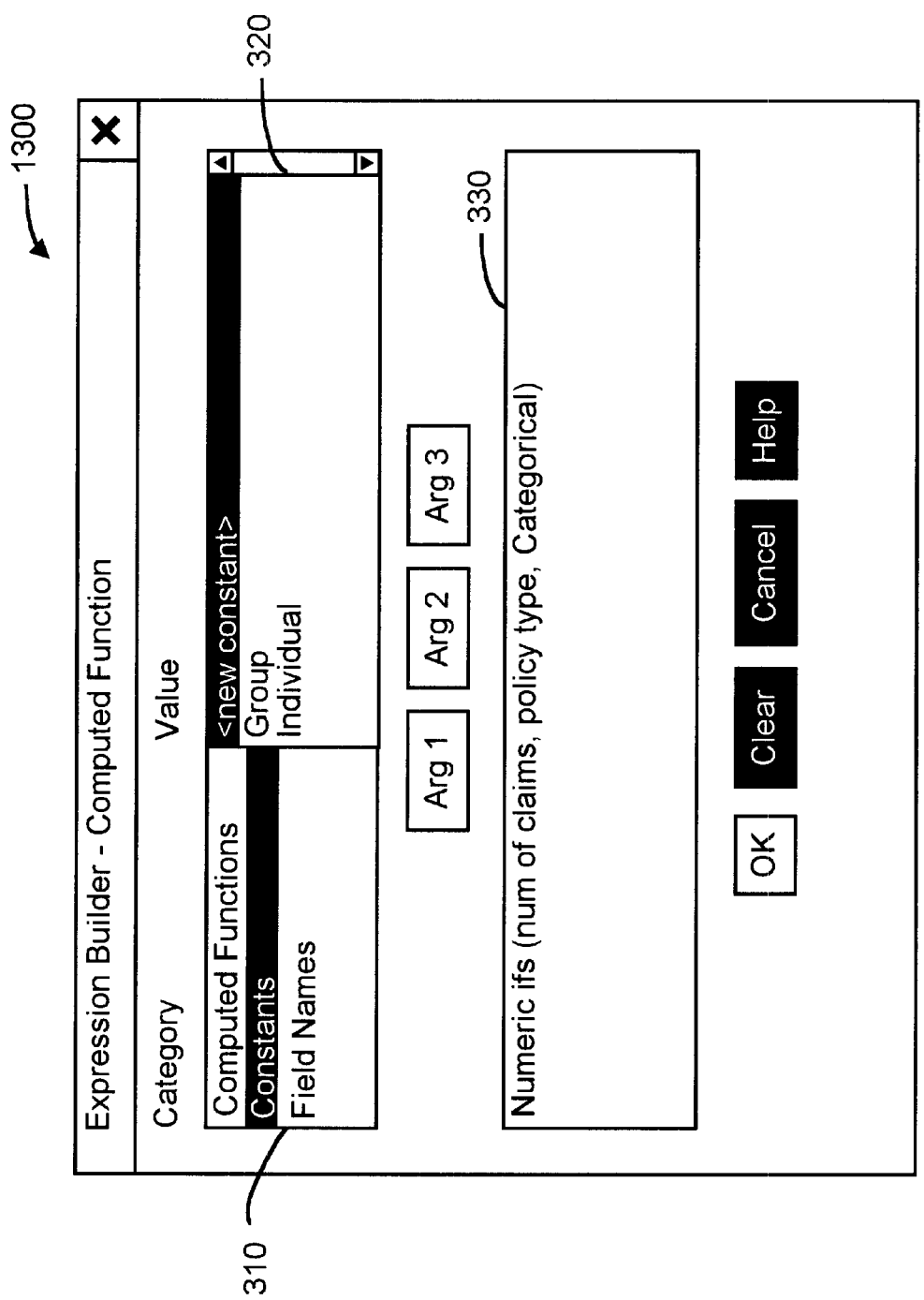
FIG. 13 depicts a screen print, illustrating the preferred Computed Function Expression Builder GUI when the user double-clicks <new constant>.
Figure 14:
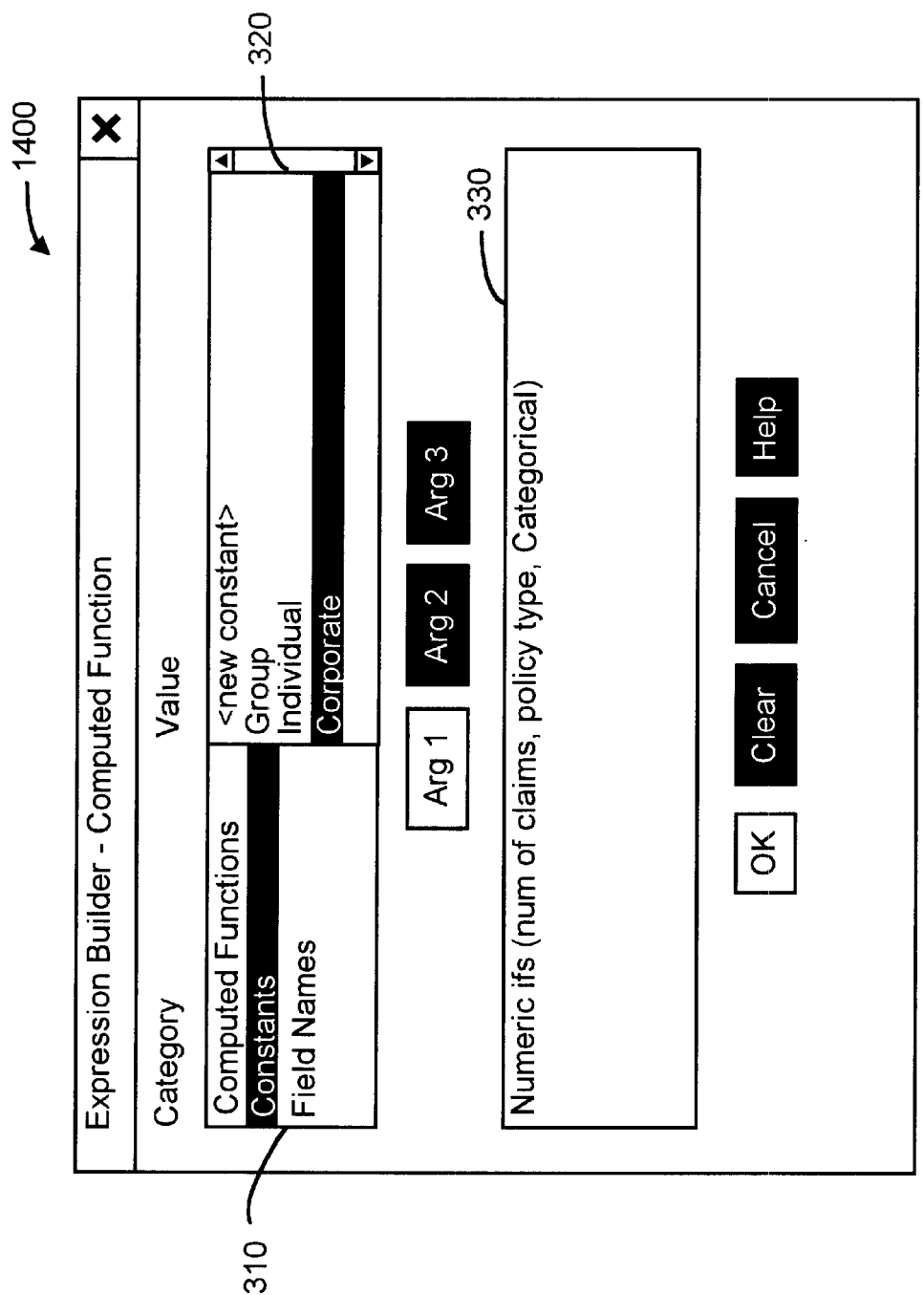
FIG. 14 depicts a screen print, illustrating the preferred Computed Function Expression Builder GUI when the user types in a Categorical new constant.

To further illustrate the operation of a preferred embodiment of a Computed Function expression builder, FIGS. 13 through 14 demonstrate the means by which a user can replace generic arguments in a template expression with constants that are not yet available. A constant is not yet available if it does not appear in window 320 when the constants category is selected in window 310.

Referring now to FIG. 13, an eleventh screen print 1300, illustrating a preferred GUI of a Computed Function expression builder in accordance with the preferred embodiments of the present invention is depicted. The user can replace an argument in the template expression in text area 330 with a constant that is not on the list in window 320. First the user double-clicks in window 320, on <new constant>, which turns <new constant> into a text entry field. A text entry field is one into which a user may type data; therefore, the user types any categorical or numerical value into the text entry field in window 320. The user then presses the return key to signal to the expression builder GUI that the text entry is complete. The expression builder GUI then appends the new constant to the end of the list of available constants in window 320. The expression builder GUI allows a user to repeat this process to append more new constants.

Referring now to FIG. 14, a twelfth screen print 1400, illustrating a preferred GUI of a Computed Function expression builder in accordance with the preferred embodiments of the present invention is depicted. In this example, after typing in a new constant, "Corporate," and pressing the return key, the newly defined constant is highlighted at the end of the list in window 320. The original <new constant> entry is restored at the top of the list to allow the user to enter additional constants. Since "Corporate" is a constant with a categorical data type, "Arg 2" and "Arg 3" buttons, which correspond to categorical arguments in the template expression in text area 330 are enabled. On the other hand, if the new constant had a numerical data type,: argument buttons corresponding to numerical arguments in the template expression in text area 330 would be enabled. Pressing an enabled button replaces the corresponding argument in the template expression in text area 330, with the newly available selected constant in window 320.

Figure 15:
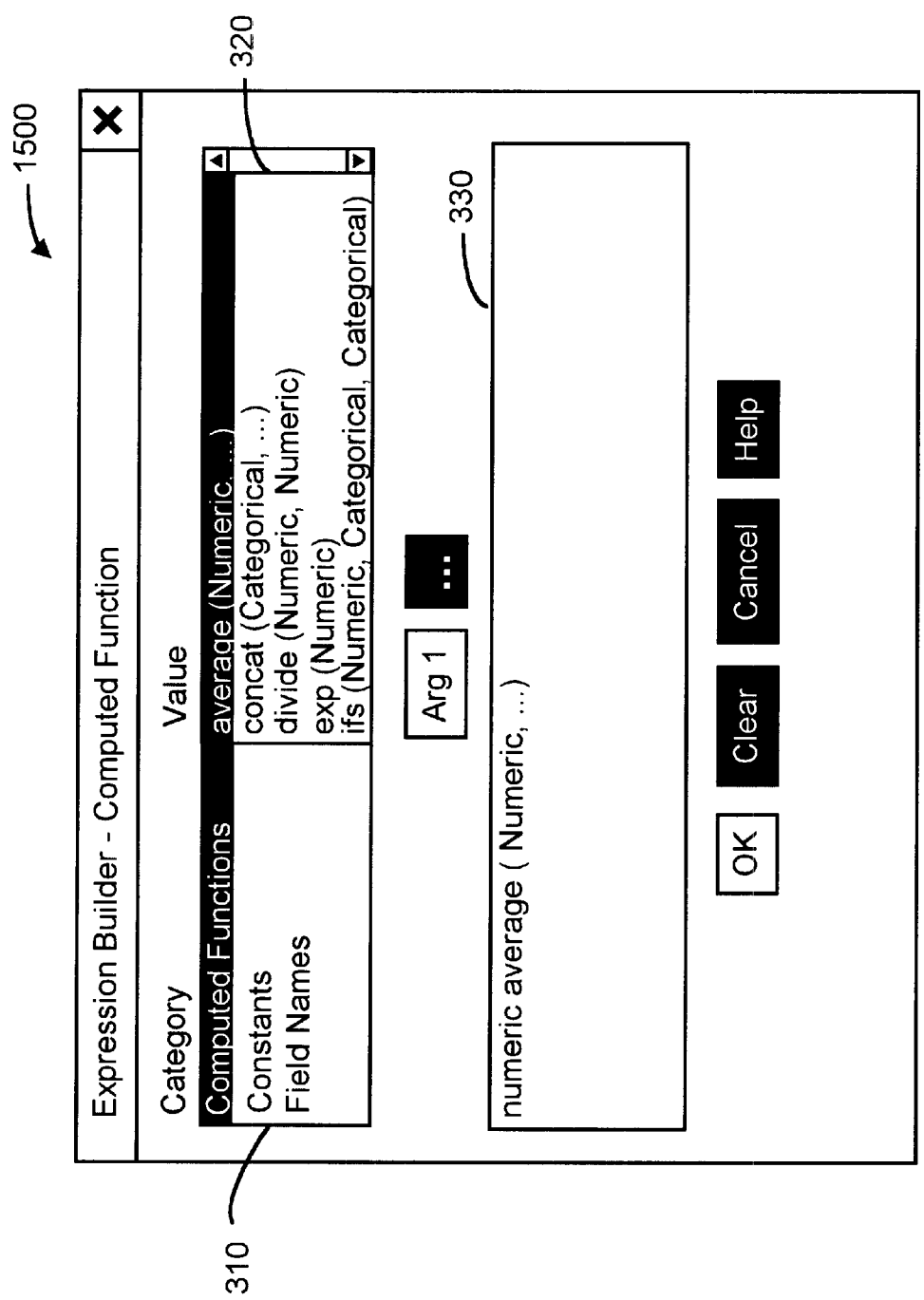
FIG. 15 depicts a screen print, illustrating the preferred Computed Function Expression Builder GUI when the user selects a computed function that contains an ellipsis.
Figure 16:
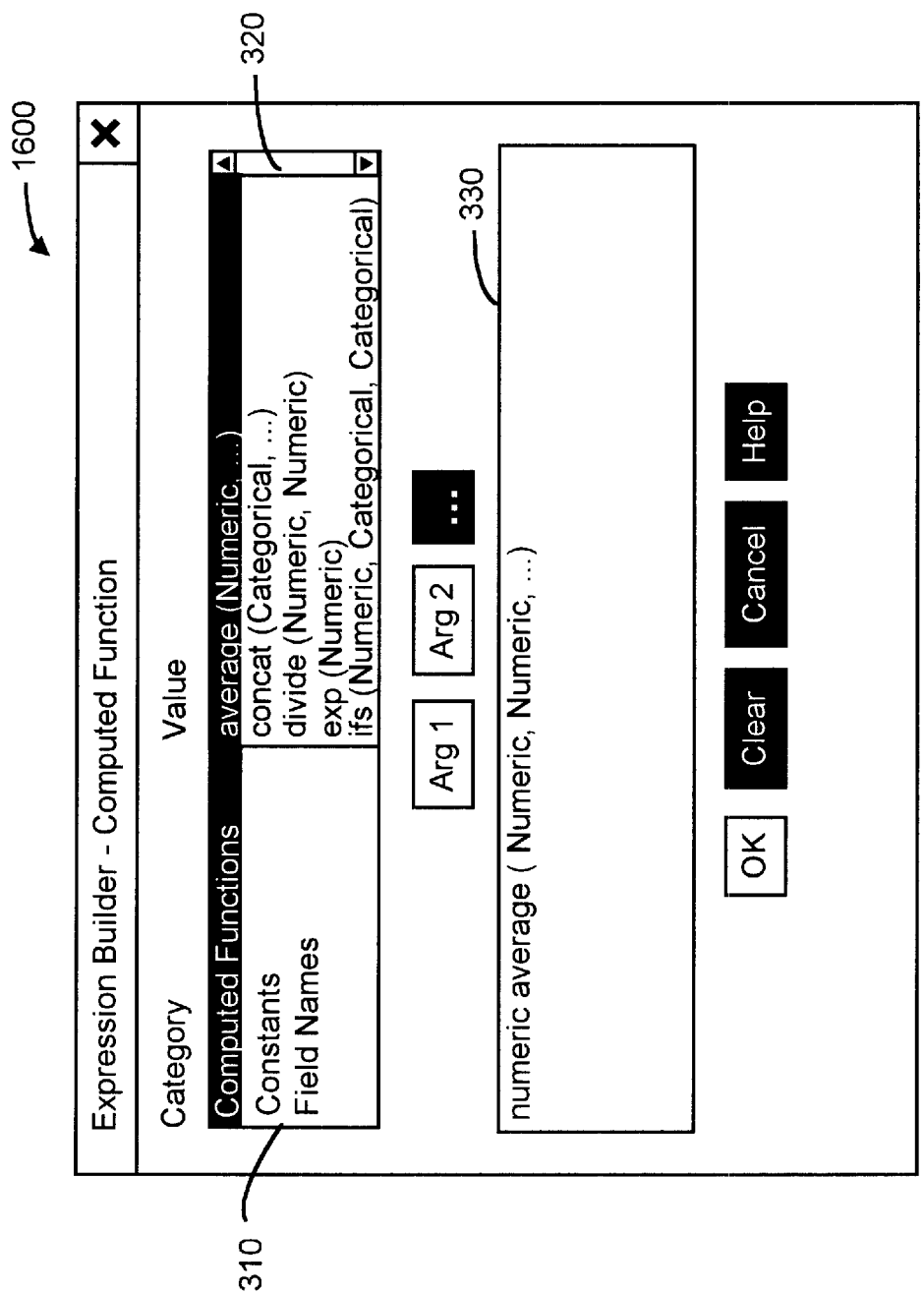
FIG. 16 depicts a screen print, illustrating the preferred Computed Function Expression Builder GUI when the user selects the ellipsis button.

As further illustration of the operation of a preferred embodiment of a Computed Function expression builder, it should be noted that some of the computed functions in window 320 can be customized to have generic arguments added to those already in the template expression in text area 330. These functions are recognizable because they contain ellipses in their generic expressions. FIGS. 15 through 16 demonstrate how to build a valid expression from a computed function containing an ellipsis.

Referring now to FIG. 15, a thirteenth screen print 1500, illustrating a preferred GUI of a Computed Function expression builder in accordance with the preferred embodiments of the present invention is depicted. If the user selects a computed function with an ellipsis from window 320, the function is copied to text area 330, and an ellipsis button appears next to the other argument buttons on the screen. The ellipsis button is immediately enabled to allow the user to add additional generic arguments to the template expression in text area 330.

In the preferred embodiment of the Computed Function expression builder, any new generic arguments added to the template expression in text area 330 will have a data type matching the generic argument (and argument button) that precedes the ellipsis. Those skilled in the art will recognize that an alternative embodiment of the present invention could allow the user to choose any appropriate data type when adding a new generic argument. If the user were allowed to choose a data type, the GUI would constrain the user's choice to data types supported by the selected computed function. In other words, some computed functions might not allow arguments having categorical data types, and the GUI would constrain the user to choosing a numeric data type in that case.

Referring now to FIG. 16, a fourteenth screen print 1600, illustrating a preferred GUI of a Computed Function expression builder in accordance with the preferred embodiments of the present invention is depicted. If the user selects the ellipsis button, another generic argument appears at the end of the list of arguments in the template expression in text area 330. A new argument button is displayed to correspond to the new generic argument. The ellipsis remains continues to appear in the template expression in text area 330 to allow more generic arguments and corresponding argument buttons to be added. When all the generic arguments in the template expression in text area 330 have been replaced with specific arguments, the OK button is enabled, even though there is an ellipsis in the template expression. Although the presence of an ellipsis in the completed expression is not syntactically correct, the expression builder GUI deletes the ellipsis prior to returning the completed expression to data query tool 124.

In the preferred embodiment of the present invention, a user may use the ellipsis button to add generic arguments to the template expression in text area 330 until the total number of arguments in the template expression reaches 12. Those skilled in the art will recognize that the program design limiting the number of arguments to 12 can easily be changed to expand the limit if and when necessary.

Referring back to FIG. 2, the first preferred embodiment of the present invention, the Computed Function expression builder GUI, is summarized. The process begins in steps 210 and 220, when the user indicates to query tool 124 that the user wants to create virtual fields. Virtual fields are created by processing specifications known as computed function expressions. Data query tool 124 invokes the first embodiment of the preferred invention, Computed Function expression builder GUI 126. The user selects a generic expression from a list of computed functions in window 320, and a template expression appears in text area 330. Thus one important advantage of the current design is that it provides the user with a generic expression that is properly formatted according to syntax rules.

Further expression building guidance is provided as the user replaces generic arguments in the template expression in text area 330 with specific arguments selected from the list in window 320. The expression builder GUI restricts the replacement of generic arguments in the template expression in text area 330 to those which have data types corresponding to the data type associated with the specific argument selected in window 320. Thus, a second important advantage the current design is that the expression builder GUI restricts customization of the template expression in text area 330 according to rules of computed function expression syntax.

The methods of the present invention have been shown to assist users in expression building. One preferred embodiment, the Computed Function expression builder GUI, has been shown to assist users in the creation of virtual fields. Users who have no idea of the syntax rules associated with such computer tasks can easily build valid processing specifications using the methods of the present design. However, these methods reach farther than the construction of queries to create virtual fields. Therefore, a second preferred embodiment, the Filter Records expression builder GUI, will now be explained and illustrated to provide further examples of the present invention.

Figure 17:
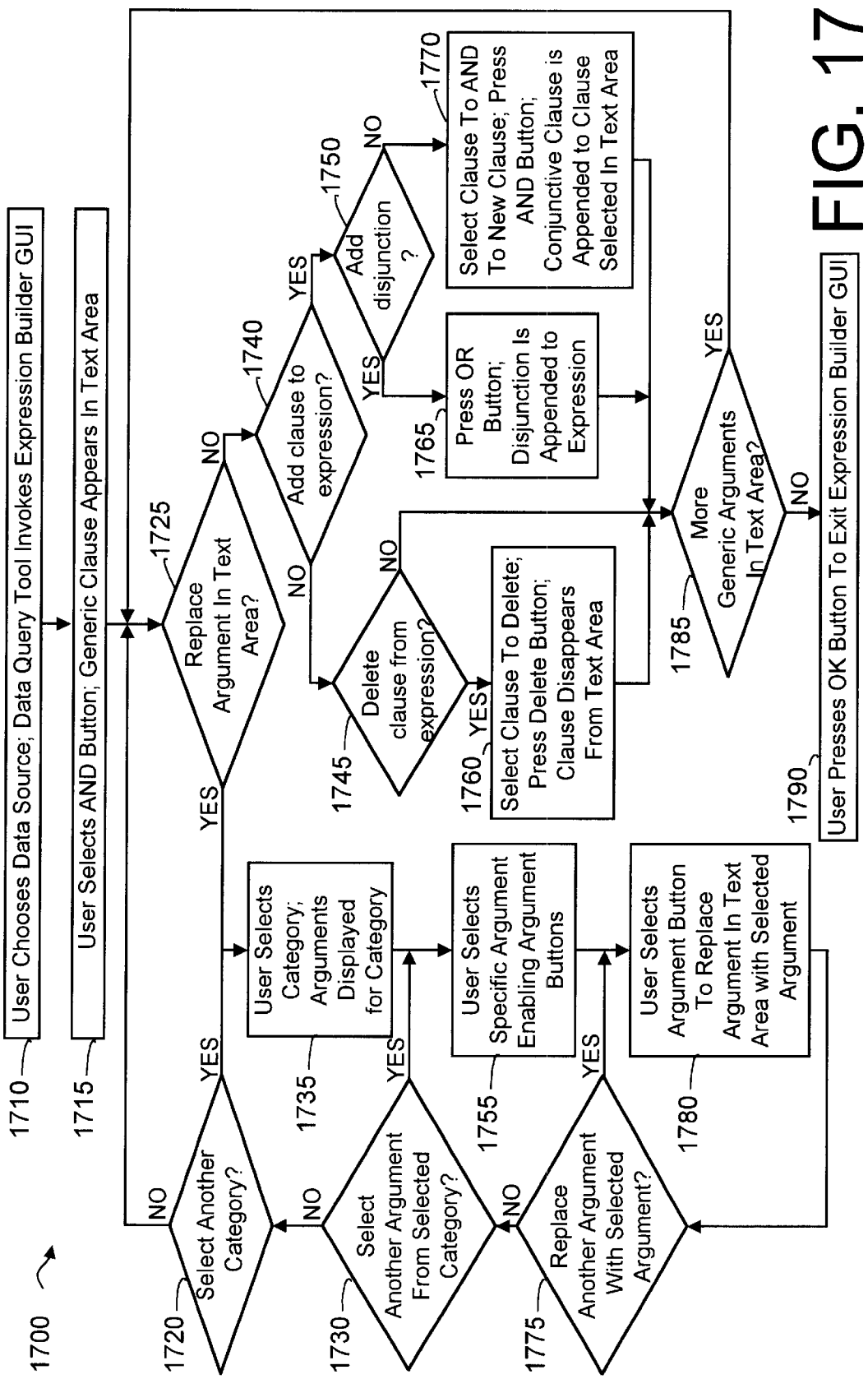
FIG. 17 is a flowchart depicting the method used to build expressions for Filtering Records according to the preferred embodiments of the present invention.

An example of a commonly used query is one that subsets a large data source according to specified requests. The user can build an expression which will extract only records in which the user is interested. Referring now to FIG. 17, a flowchart of the method according the second of two preferred embodiments of the present invention, by which a user filters records from data source 128 is disclosed. In steps 1710, the user selects data source 128, and indicates to query tool 124 the desire to filter records from data source 128. Query tool 124 invokes expression builder GUI 126, which for this task is the Filter Records expression builder GUI.

Figure 18:
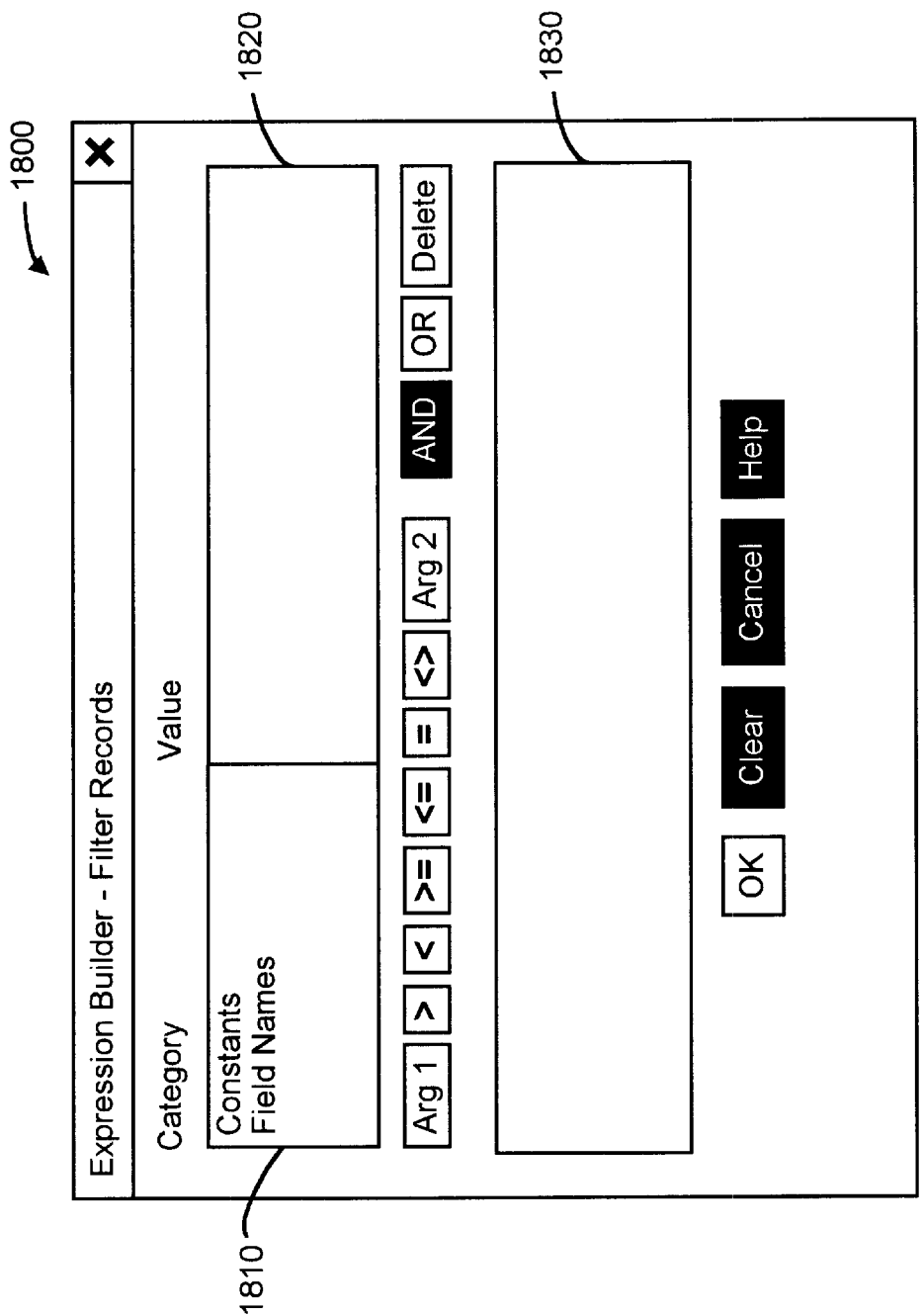
FIG. 18 depicts a screen print, illustrating how the preferred Filter Records Expression Builder GUI appears when first invoked.

Referring now to FIG. 18, a first screen print 1800, illustrating a preferred GUI of a Filter Records expression builder in accordance with the preferred embodiments of the present invention is depicted. Screen print 1800 portrays the GUI as it first appears to the user. The GUI is initialized with no category of specific arguments selected in window 1810; therefore, window 1820, which functions to display a list of arguments available for a category selected in window 1810, is empty. The GUI is further initialized with a blank text area 1830.

In the preferred embodiment, the buttons which appear on the Filter Records expression builder GUI do not vary with the operation of the GUI, as they do in the first preferred embodiment of the present invention, the Computed Function expression builder GUI. Instead, the same buttons always appear on the Filter Records expression builder screen. These buttons function to constrain the expression building by activating (button appears in black) or by deactivating (white), in response to selections made by the GUI user. As the GUI first appears to the user, only the AND, Clear, Cancel, and Help buttons are enabled.

The AND button is the means by which the user initially selects a generic expression, also called a "clause," to be copied to text area 1830. In this preferred embodiment of the expression builder GUI, a clause is a boolean relation, which includes two generic arguments joined together by a relational operator. The generic expression for this preferred embodiment of a Filter Records expression builder will always take the initial form "arg1=arg2." Selecting the AND button is the first step to building an expression to filter-records from data source 128.

The Clear button re-initializes the Filter Records expression builder GUI. The user may choose to select the Clear button to clear out text area 1830 when wanting to start over building a new expression. Any expression in text area 1830 when the Clear button is selected is erased, and not passed back nor executed by query tool 124.

The Cancel button returns control to query tool 124. Selecting Cancel relinquishes control without passing any expression that might be partially or totally constructed in text area 1830.

The Help button invokes a separate GUI to provide the user with instructions and assistance in operating the Filter Records expression builder GUI. Those skilled in the art understand that selecting the Help button could also provide instruction with other programs that are operating simultaneously to the Filter Records expression builder GUI, such as the query tool, or the operating system.

The OK button is not initially enabled, and thus appears as a white button on screen print 1800. The OK button remains disabled until a complete expression has been constructed text area 1830. A complete expression is one in which the user has replaced all generic arguments with specific arguments.

Figure 19:
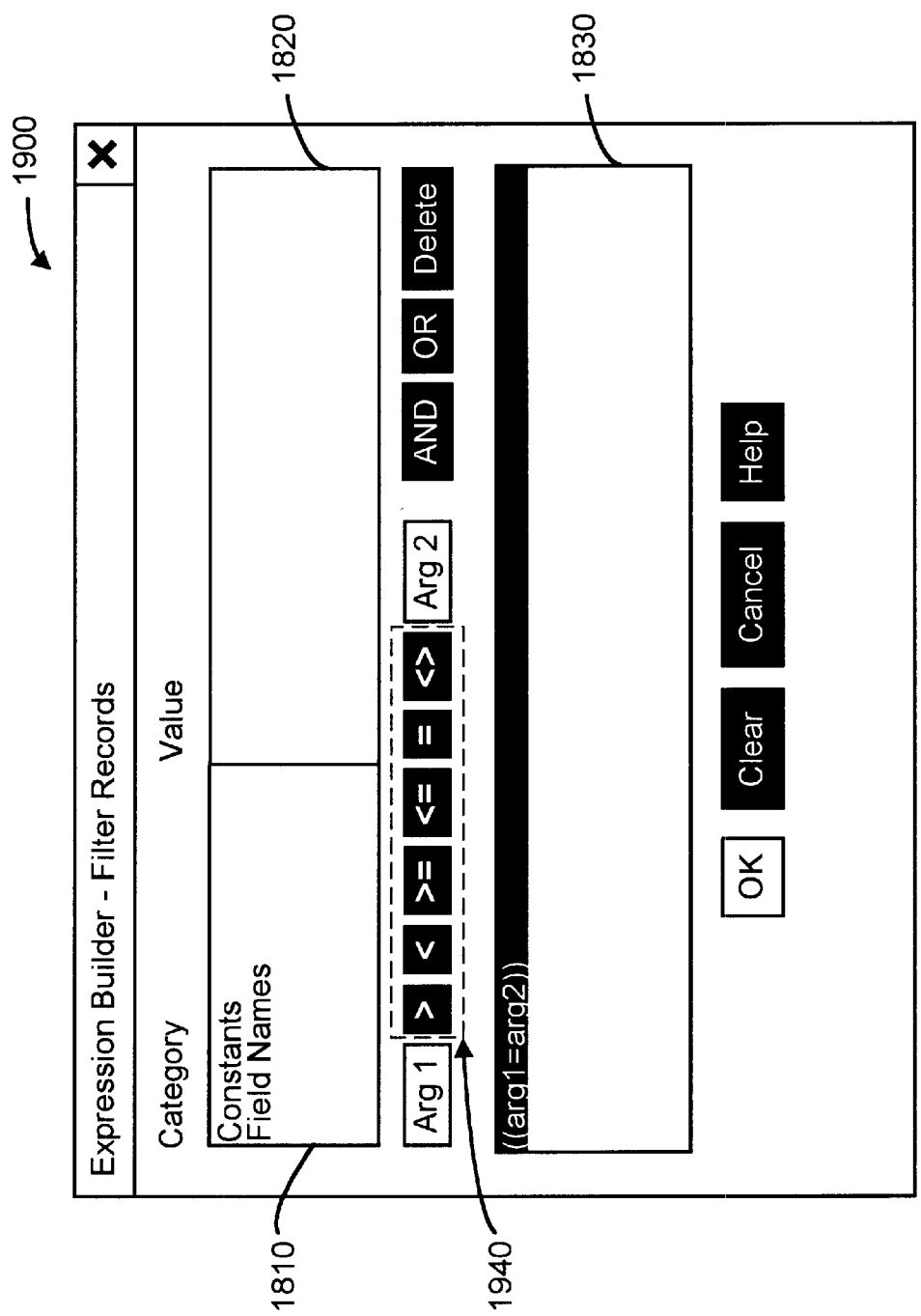
FIG. 19 depicts a screen print, illustrating the preferred Filter Records Expression Builder GUI when the user selects the "AND" button.

Referring back to FIG. 17, step 1715, the user selects the AND button and a generic expression, in the form of a clause, appears in text area 1830. Referring now to FIG. 19, a second screen print 1900, illustrating a preferred GUI of a Filter Records expression builder in accordance with the preferred embodiments of the present invention is depicted. After the user has selected the AND button for the first time, a generic expression "((arg1=arg2)) appears selected in text area 1830. The AND button remains enabled, and the OR, and Delete buttons become enabled.

In the preferred embodiment, the AND button may be selected again at any time. A subsequent selection of the AND button conjunctively appends another clause to the generic expression in text area 1830. The OR buttons may also be selected at any time. The OR button disjunctively appends another clause to the generic expression in text area 1830. The Delete button may also be used at any time. The Delete button is selected to delete a selected clause from the expression in text area 1830. Further use of the AND button, as well as use of the OR and Delete buttons are demonstrated later in this Detailed Description.

Relational operator buttons 1940 are also enabled whenever there is a selected clause in text area 1830. Selecting any one of relational operator buttons 1940 will replace the relational operator in the selected clause in text area 1830 with the operator represented on the face of the button. Because the generic. expression always contains an equals sign, the user employs relational operator buttons 1940 to change the equals sign to another relational operator.

The generic clause in text area 1830 contains 2 generic arguments: "arg1," and "arg2." The buttons corresponding to these arguments are labeled "Arg 1" and "Arg 2." These buttons are not enabled until a specific argument is selected in window 1820. It should be noted that this, the second, preferred embodiment of the present invention, differs from the first preferred embodiment, in that the argument buttons in this Filter Records expression builder GUI do not become enabled or disabled according to data type of the arguments in text area 1830. Instead, the argument buttons become enabled whenever any specific argument is selected in window 1820, regardless of its data type.

Referring back to FIG. 17, steps 1725 asks if the user wants to replace a generic argument with a specific argument. If so, the user first selects a category in step 1735, which prompts the GUI to display a list of specific arguments for that category in window 1820.

Figure 20:
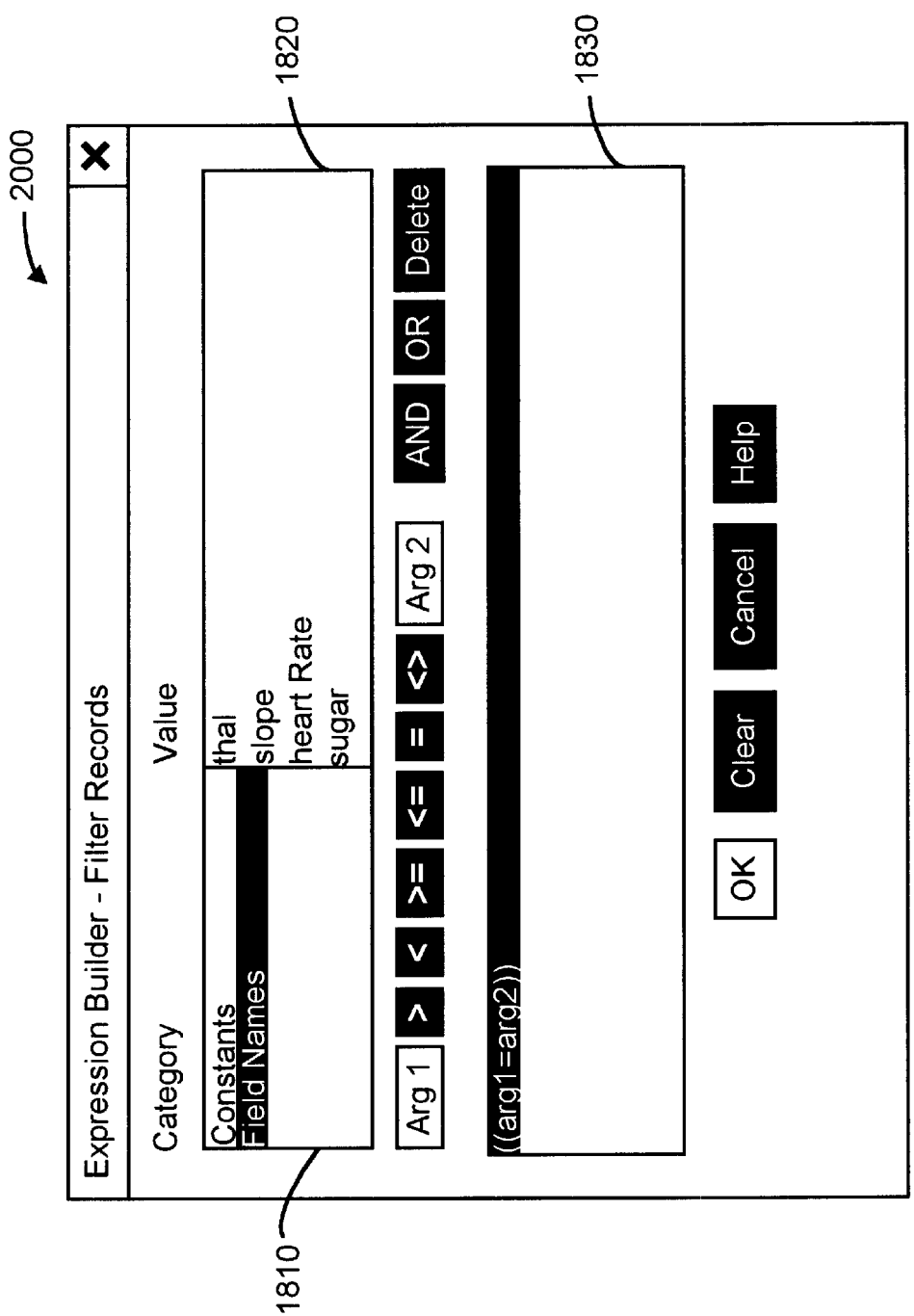
FIG. 20 depicts a screen print, illustrating the preferred Filter Records Expression Builder GUI when the user selects the Field Name category.

Referring now to FIG. 20, a third screen print 2000, illustrating a preferred GUI of a Filter Records expression builder in accordance with the preferred embodiments of the present invention is depicted. If the user selects Field Names from the categories listed in window 1810, a list of available fields from the selected data source appear in window 1820. Fields are "available" if they are fields in the data source or if they are existing virtual fields.

Referring back to FIG. 17, steps 1755 and 1780, the user selects an argument from the list of available arguments in the selected category. The "Arg 1" and "Arg 2" buttons become enabled. Selecting an enabled argument button allows the user to replace the corresponding argument in the selected clause in text area 1830 with the specific argument selected in window 1820.

Figure 21:
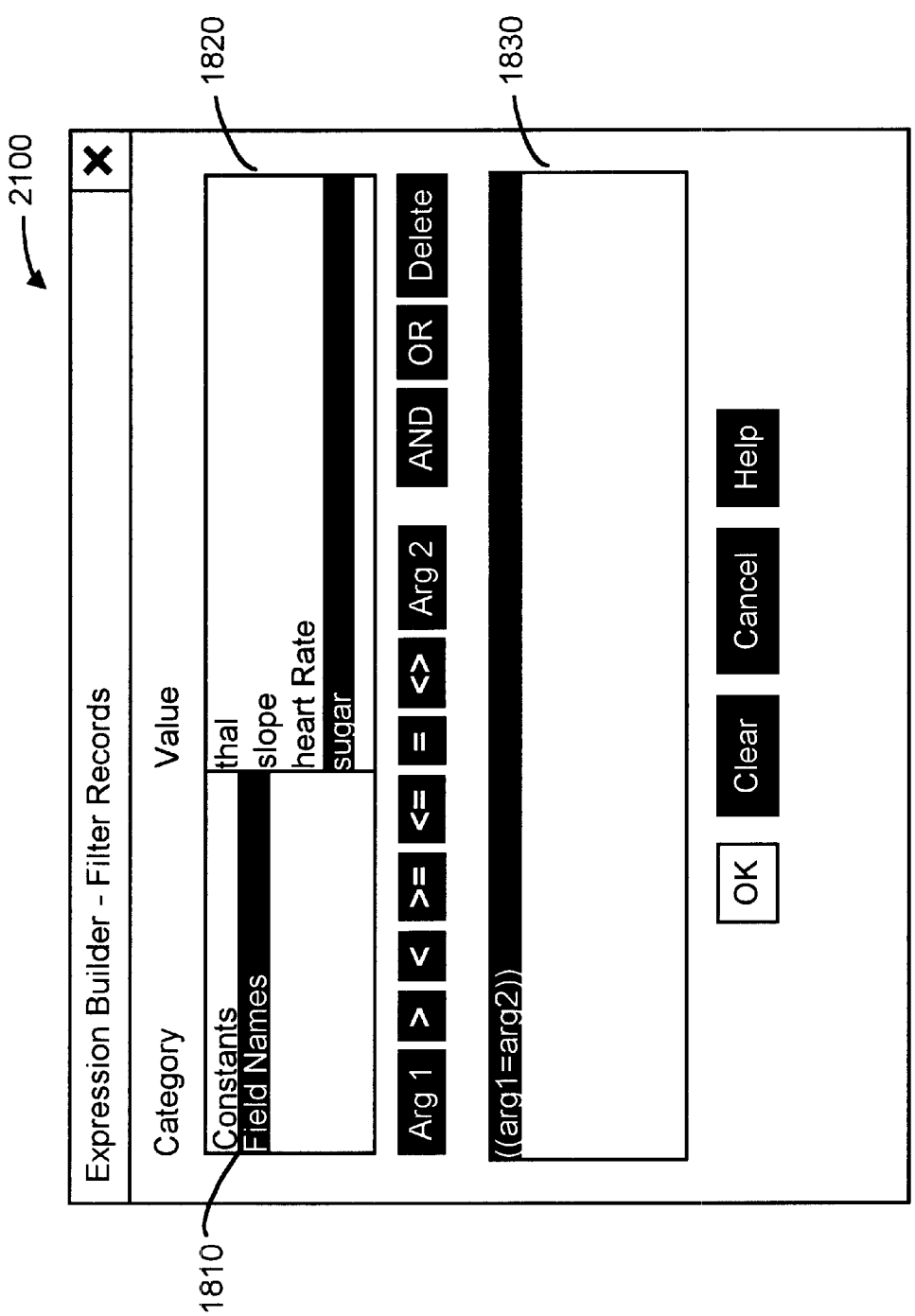
FIG. 21 depicts a screen print, illustrating the preferred Filter Records Expression Builder GUI when the user selects a specific argument in the list.

Referring now to FIG. 21, a fourth screen print 2100, illustrating a preferred GUI of a Filter Records expression builder in accordance with the preferred embodiments of the present invention is depicted. In this example, the user selected the specific argument, "sugar," in window 1820, from the list of available fields in the selected data source. "Arg 1" and "Arg 2" buttons become enabled to allow the user to select one of these buttons to replace the corresponding generic argument in the selected clause in text area 1830 with "sugar."

Figure 22:
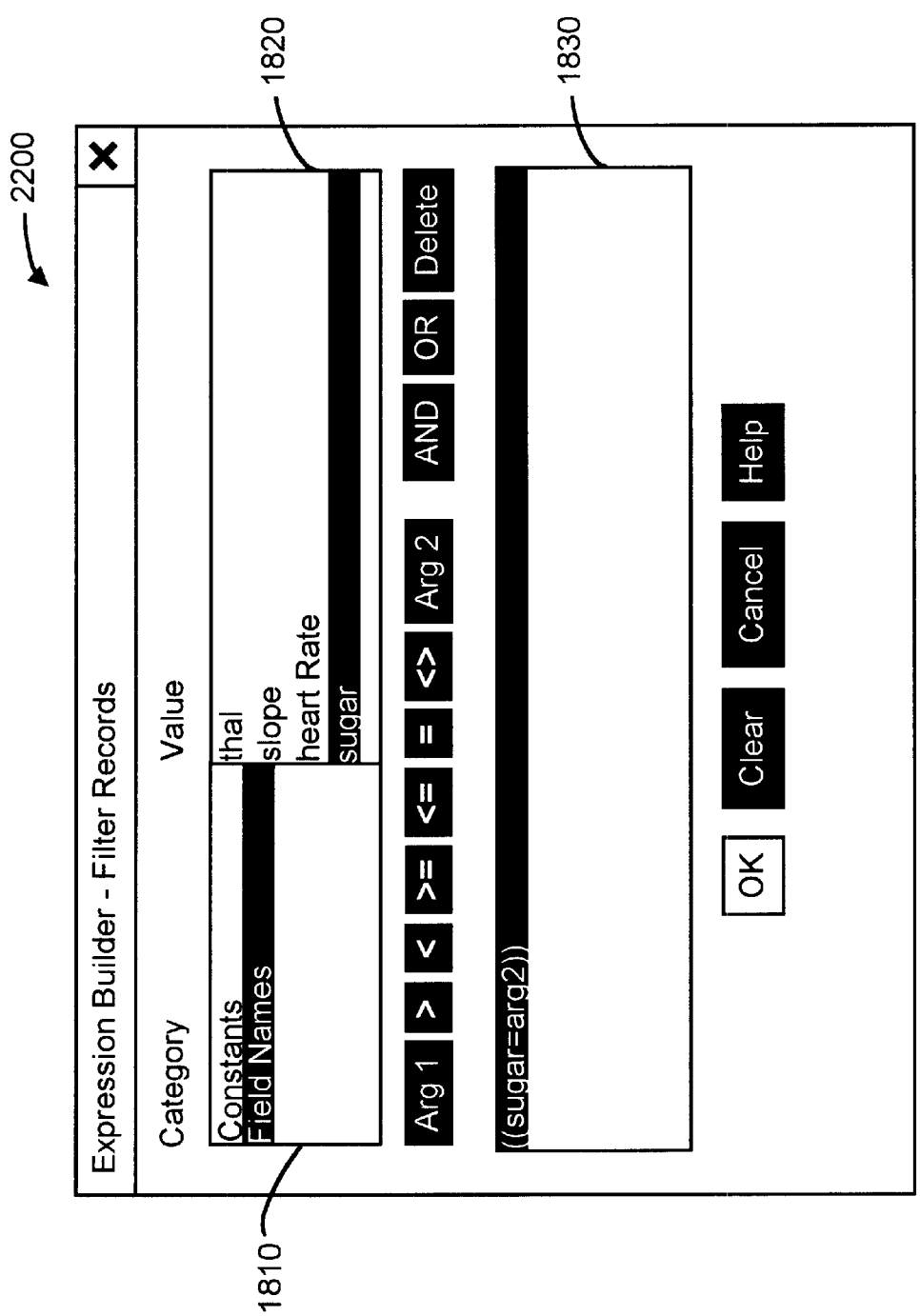
FIG. 22 depicts a screen print, illustrating the preferred Filter Records Expression Builder GUI when the user selects the Arg 1 button.

Referring now to FIG. 22, a fifth screen print 2200, illustrating a preferred GUI of a Filter Records expression builder in accordance with the preferred embodiments of the present invention is depicted. When the user selects the "Arg 1" button, the selected argument, "sugar," in window 1820, replaces the first argument in the selected clause in text area 1830.

Referring back to FIG. 17, step 1775, demonstrates that the user could select another argument button and replace another corresponding generic argument with the specific argument that is currently selected in window 1820. The user might opt to do this if the expression in text are 1.830 had multiple clauses disjunctively joined together. The user might want to replace "arg1" in each of these clauses with the field "sugar." The user can do this by merely selecting a different clause in text area 1830 and then re-selecting the argument button. In this case the user might executed steps 1780 and 1775 repetitively.

If the user opts not to replace any further arguments with the specific argument selected in window 1820, step 1730 asks whether the user wants to replace a generic argument with a different specific argument in the selected category. In step 1755, the user selects a different specific argument from the list in window 1820, which prompts the GUI to enable the argument buttons. In step 1780, the user selects an argument button to replace the corresponding argument with the newly selected specific argument. Again, in the case of a complex expression in text area 1830, which has multiple clauses, the user can opt to replace all the field name arguments by repetitively executing steps 1755, 1780, 1775, and 1730.

Figure 23:
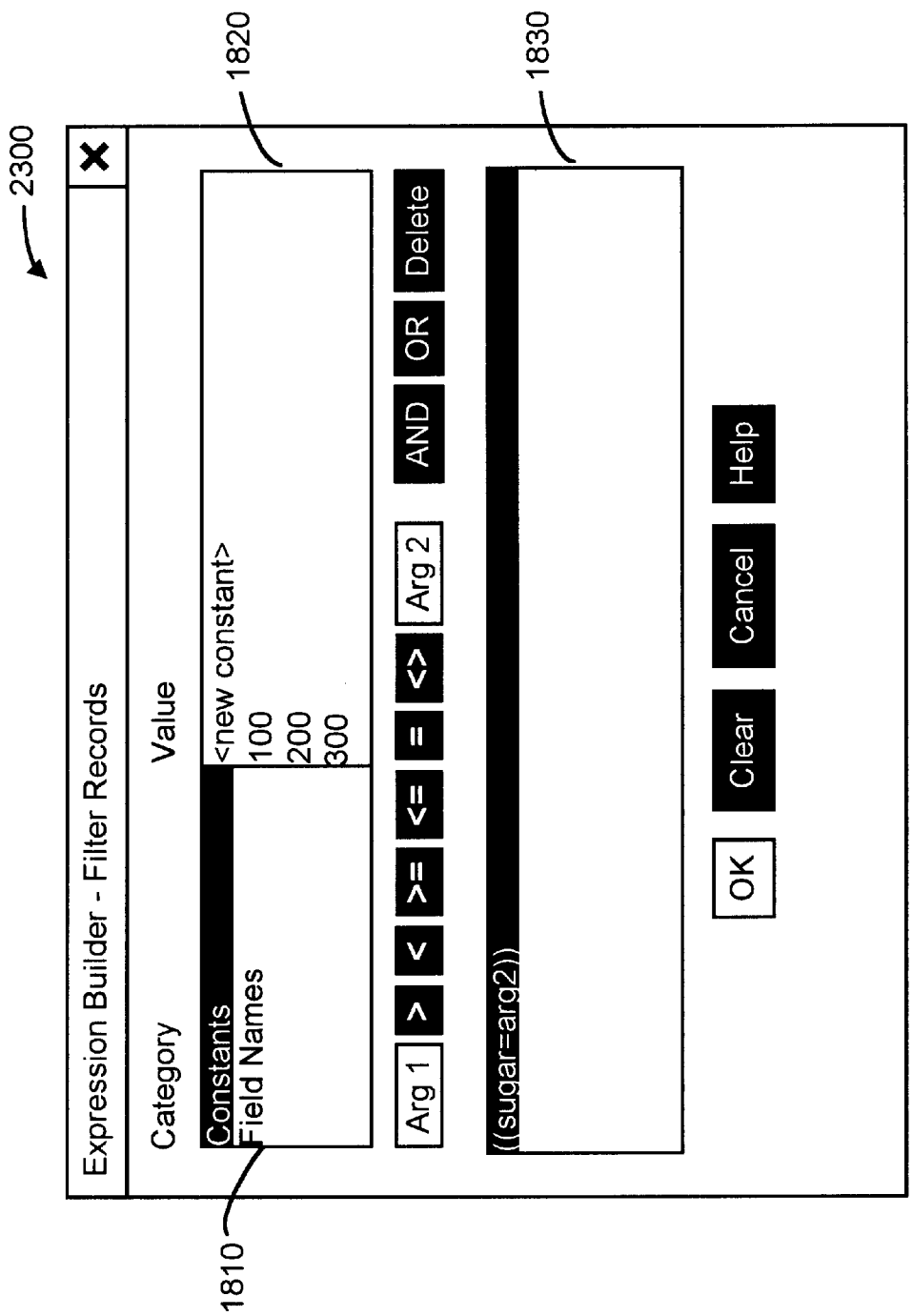
FIG. 23 depicts a screen print, illustrating the preferred Filter Records Expression Builder GUI when the user selects the Constants category.

Step 1720 asks if the user wants to continue replacing generic arguments, but to switch categories of specific arguments. In step 1735, the user selects a new category, which prompts the GUI to display a list of available specific arguments in window 1820. Referring now to FIG. 23, a sixth screen print 2300, illustrating a preferred GUI of a Filter Records expression builder in accordance with the preferred embodiments of the present invention is depicted. When the user selects a new category, "Constants," available constants are displayed in window 1820.

If no constants have been defined yet, window 1820 will display only <new constant>, which is an entry that a user can double-click to define new constants. Once a user defines new constant, the newly defined constant continues to be available while the data query tool that invoked the Filter Records expression builder GUI is in use. In this example, there are three constants, "100," "200," and "300," listed in window 320. It should be noted that since no argument in window 1820 has yet been selected by the user, the "Arg 1," and "Arg 2" buttons are disabled.

Figure 24:
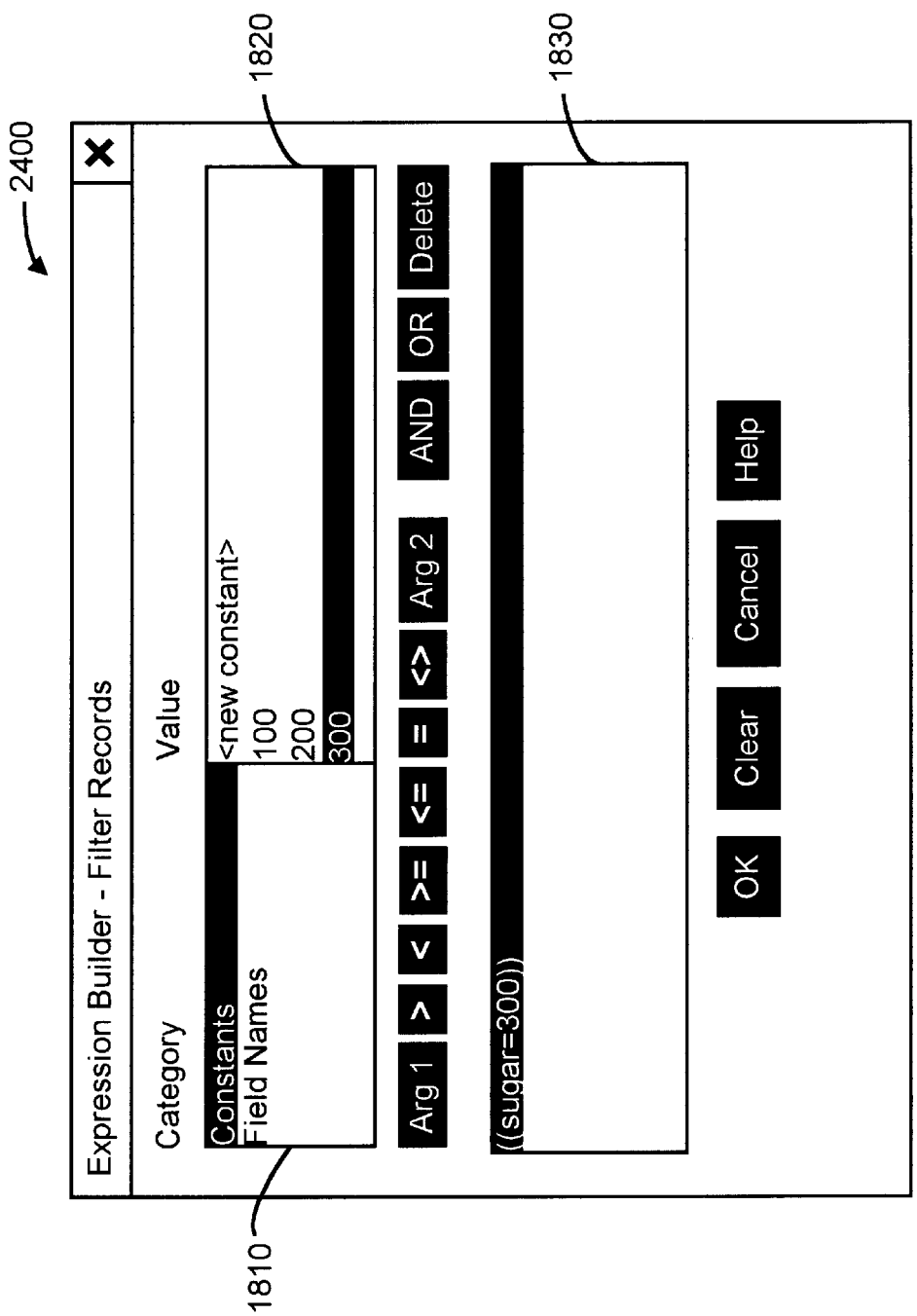
FIG. 24 depicts a screen print, illustrating the preferred Filter Records Expression Builder GUI when the user selects a specific argument in the list, and subsequently selects the Arg 2 button.

Referring now to FIG. 24, a seventh screen print 2400, illustrating a preferred GUI of a Filter Records expression builder in accordance with the preferred embodiments of the present invention is depicted. When the user selects an argument in window 1820, the "Arg 1" and "Arg 2" buttons become enabled. Subsequently, when the user selects the "Arg 2" button, the selected argument in window 1820, "300," replaces the second argument in the selected clause in text area 1830.

It should be noted that generic arguments need not be replaced in any order. Further a user can replace an argument in the selected clause in text area 1830 even though the user may have replaced that same argument once before. As shown in screen print 2400, all generic arguments in the expression text area 1830 have all been replaced with specific arguments. The Filter Record expression builder GUI therefore enables the OK button.

Referring back to FIG. 17, steps 1775, 1730, 1720, and 1725, if the user opts not to replace another argument in text area 1830, the user can alternatively append a clause to the expression in text area 1830. It should be noted that the user can opt to append clauses to the expression in text area 1830 before replacing any generic arguments if so desired. For illustration purposes only, the sequence of steps to replace arguments in the first clause were performed first. And if the user wanted to build only a simple expression containing one clause, the expression building would now be complete. In that case, the user would answer no to steps 1740, 1745, and 1785. In step 1790, the user selects the OK button, which prompts the GUI to return the completed expression to data query tool 124 and to relinquish control. At that point, the GUI disappears from the user's screen.

In the example illustrated by FIGS. 18 through 24, the user employed method 1700 to build a valid Filter Records expression. Method 1700 facilitates the building of an expression, even for users who are not familiar with the syntax necessary to filter records from data source 128. The design of the preferred embodiment of the present invention provides the user with generic clauses and allows the user to customize them into a valid expression, by allowing the -replacement of generic arguments with specific arguments. In this way, the Filter Records expression builder GUI facilitates the building of syntactically correct queries.

To further illustrate the operation of a preferred embodiment of a Filter Records expression builder, FIGS. 24 through 28 demonstrate the operation of the AND, OR, and Delete buttons. It should be recalled, from the discussion of FIG. 18, that the AND button is employed by the user upon first entering the Filter Records expression builder GUI to put the first clause into text area 1830. Therefore initial selection of the AND button differs from subsequent selections. Subsequently selecting the AND button, as well as selecting the OR, and/or Delete buttons allow the user to build complex expressions in text area 1830.

Referring now to FIG. 17, step 1740, if the user does want to append a clause to the expression in text area 1830, step 1750 asks if the user wants to append a clause disjunctively to the selected expression. The user may want to append a clause conjunctively instead. Step 1770 illustrates how the user appends a clause conjunctively. The clause in text area 1830 to which the new clause will be appended must first be selected. If only one clause exists in text area 1830, that clause will already be selected. The user then selects the AND button, which inserts"AND (arg1=arg2)" into the selected clause in text area 1830.

Figure 25:
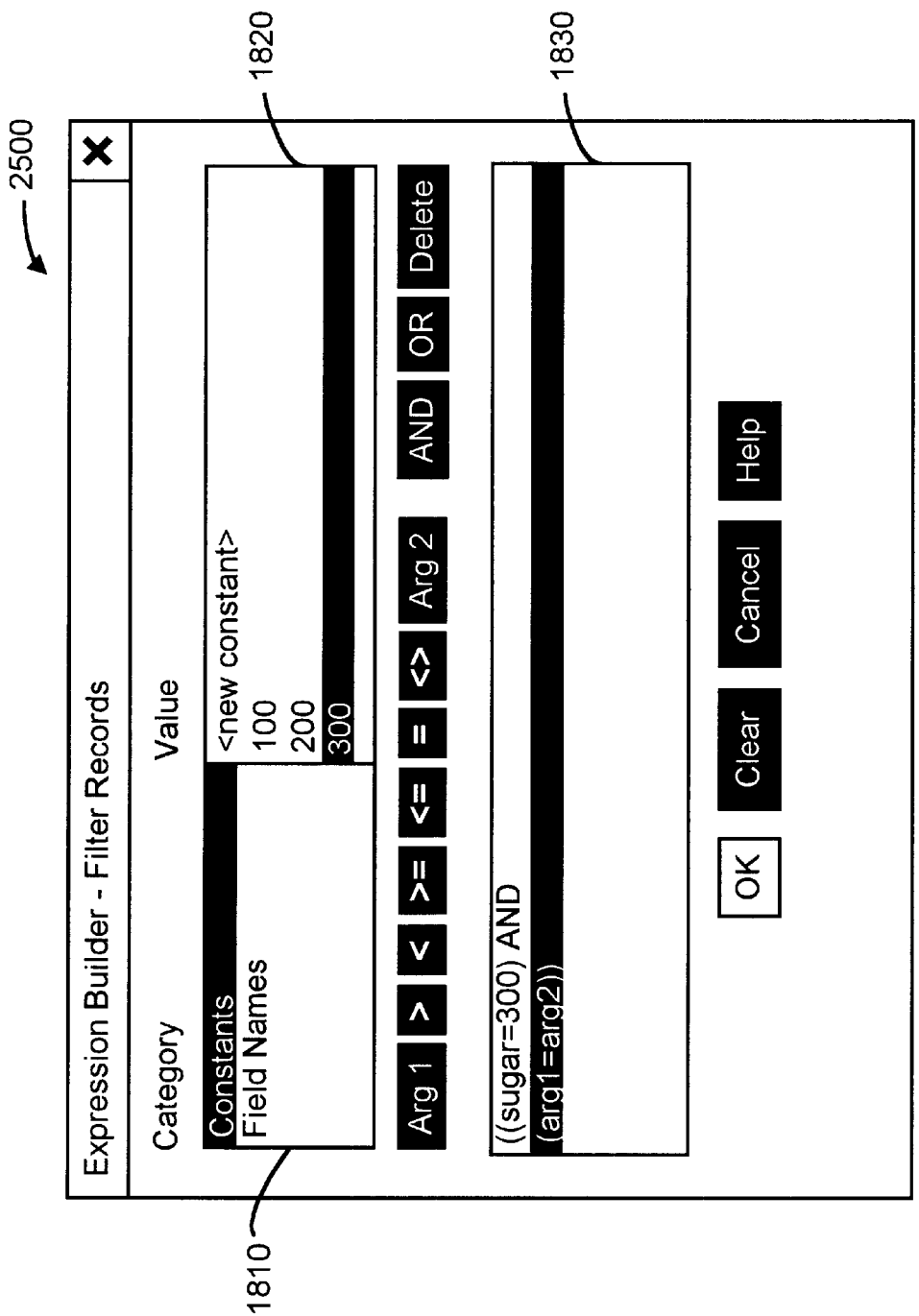
FIG. 25 depicts a screen print, illustrating the preferred Filter Records Expression Builder GUI when the user selects the AND button a second time.

Referring now to FIG. 25, an eighth screen print 2500, illustrating a preferred GUI of a Filter Records expression builder in accordance with the preferred embodiments of the present invention is depicted. The user selected the AND button, which appended "AND (arg1=arg2)" to the previously selected clause. The new clause appears with focus in text area 1830. It should be noted that since there now are new generic arguments to be replaced, the GUI disabled the OK button. Referring back to FIG. 17, step 1785, since there are now more generic arguments to replace in the expression in text area 1830, control passes back to step 1725.

Perhaps the user wants to construct an even more complex expression before replacing any more generic arguments in the expression already existing in text area 1830. For instance, the user might want to append another clause disjunctively. The user would answer Yes to steps 1740 and 1750, which passes control to step 1765. Selecting the OR button appends a disjunctive clause, "OR ((arg1=arg2))" to the expression in text area 1830.

Figure 26:
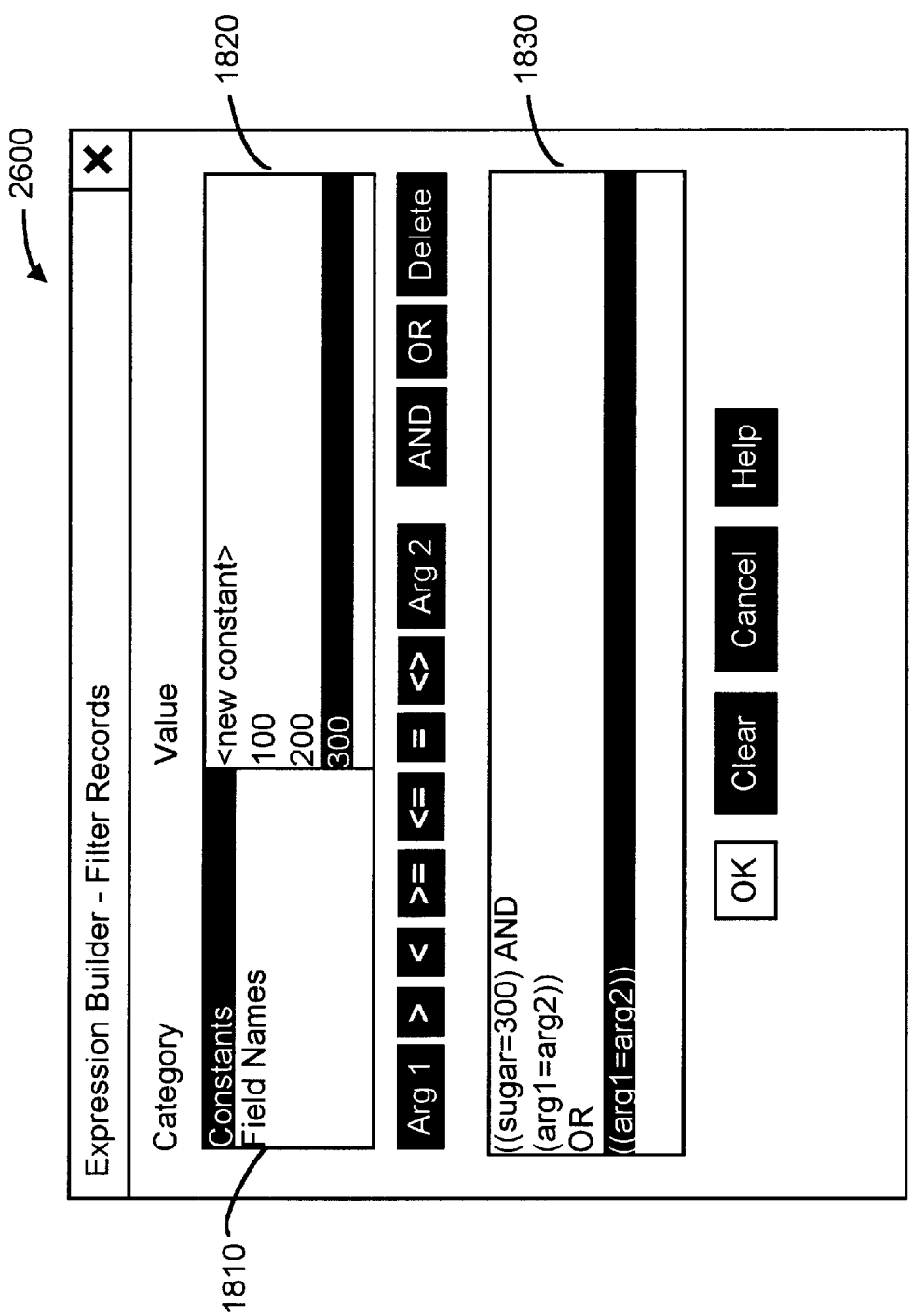
FIG. 26 depicts a screen print, illustrating the preferred Filter Records Expression Builder GUI when the user selects the OR button.

Referring now to FIG. 26, a ninth screen print 2600, illustrating a preferred GUI of a Filter Records expression builder in accordance with the preferred embodiments of the present invention is depicted. When the user selects the OR button, "OR ((arg1=arg2))" is appended to the expression in text area 1830. The newly added clause is highlighted.

Referring back to FIG. 17, step 1785, since the expression contains more generic arguments that have yet to be replaced, control passes to step 1725. At this point, the user might employ steps 1735, 1755, and 1780 to replace one of the outstanding generic arguments in text area 1830 with a specific argument in window 1820. It should be noted that selecting argument buttons effect replacements of arguments in the selected clause in the expression in text area 1830. Thus, arguments cannot be replaced in a clause unless it is the selected clause in text area 1380.

For instance, referring back to FIG. 25, "(arg1 =arg2))" is selected in text area 1830. Thus the user can replace arguments in that clause by selecting arguments from window 1820 and selecting argument buttons. The user cannot, however, replace arguments in the clause, "((sugar=300) AND," because that clause is not selected. If the user wishes to replace arguments in that clause, the user must first select the clause, "((sugar=300) AND" in text area 1830.

Referring now to FIG. 17, steps 1745 and 1760, at any time in the expression building process, the user may opt to delete a clause from the expression in text area 1830. The user employ the Delete button to simplify the complexity of the existing expression. To delete a clause, the user must first select the clause to delete. Selecting the Delete button removes the selected clause from the expression in text area 1830.

Figure 27:
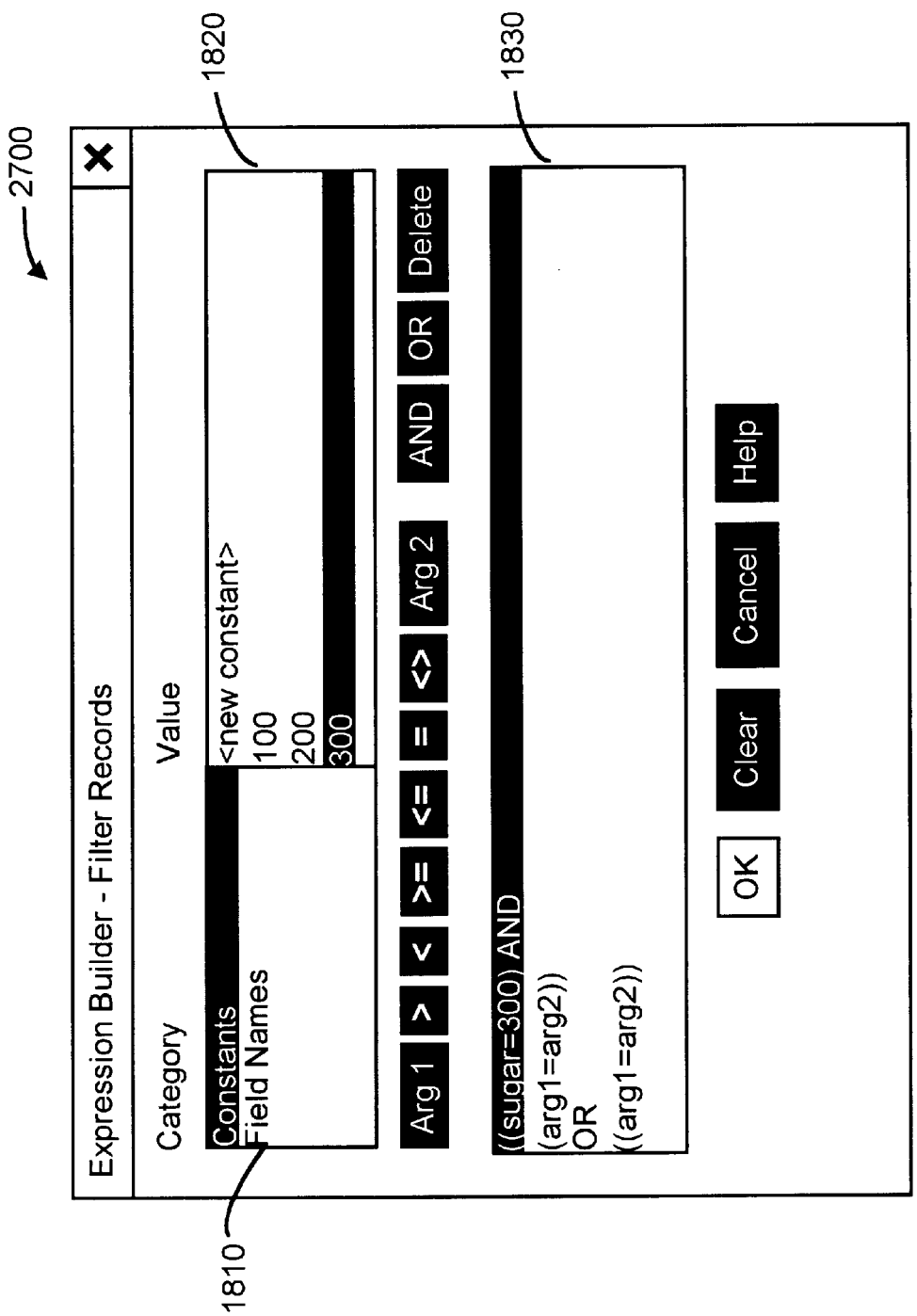
FIG. 27 depicts a screen print, illustrating the preferred Filter Records expression builder before when the user selects the Delete button.

Referring now to FIG. 27, a tenth screen print 2700, illustrating a preferred GUI of a Filter Records expression builder in accordance with the preferred embodiments of the present invention is depicted. If the user wants to delete the first clause in the expression, "(sugar=300)", the user must first selects that clause.

Figure 28:
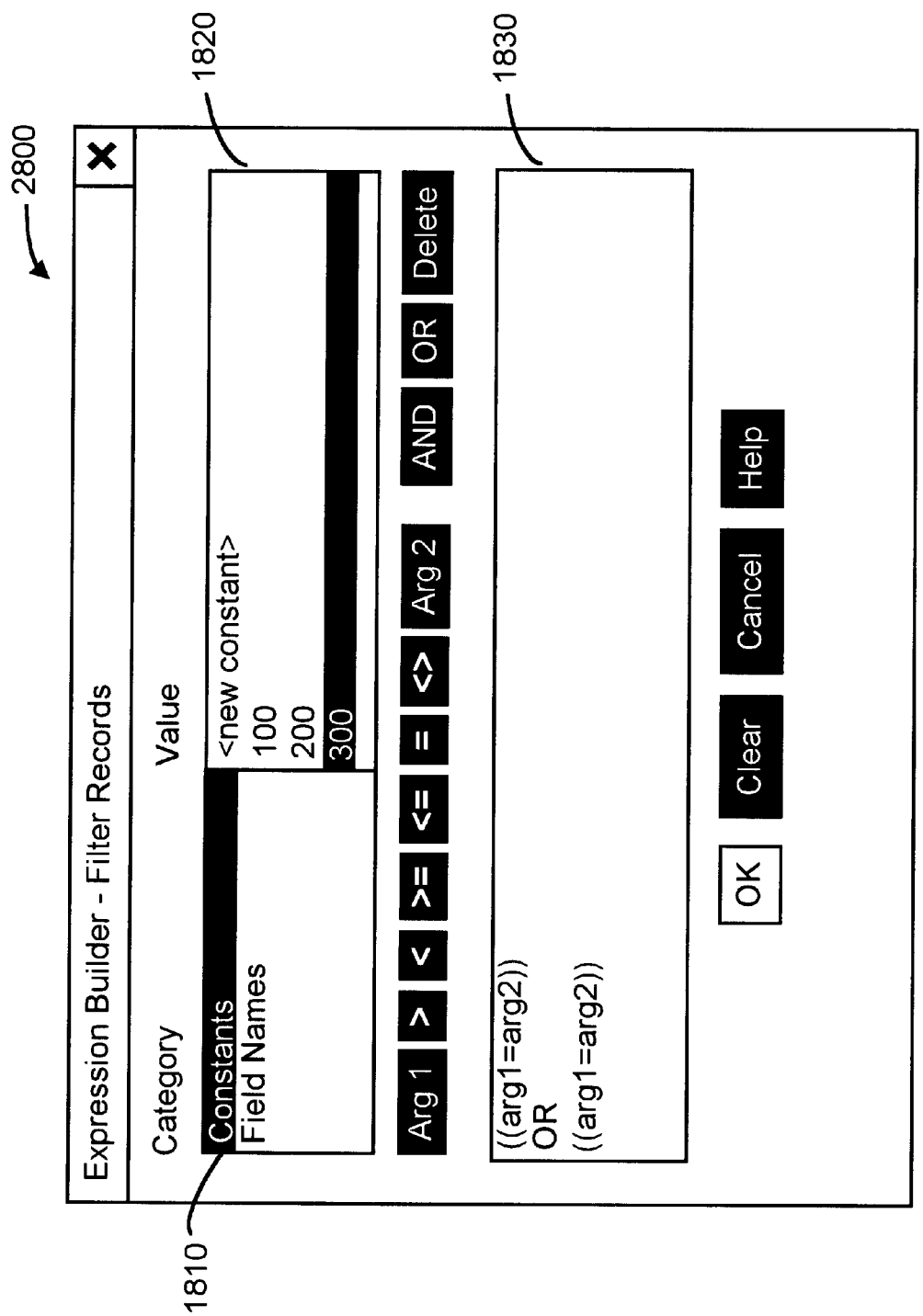
FIG. 28 depicts a screen print, illustrating the preferred Filter Records Expression Builder GUI when the user selects the Delete button.

Referring now to FIG. 28, an eleventh screen print 2800, illustrating a preferred GUI of a Filter Records expression builder in accordance with the preferred embodiments of the present invention is depicted. Once the user has selected the clause to be deleted and selects the Delete button, screen print 2800 shows the resulting expression. "(sugar=300) AND" was deleted from text area 1830.

Referring back to FIG. 17, all steps in method 1700 have been demonstrated. The user of the Filter Records expression builder GUI employs method 17 to select clauses, thus building a simple or complex generic expression. The user employs method 1700 to replace generic arguments in the generic expression in text area 1830 with specific arguments selected in window 1820. When the GUI detects that all generic arguments have been replaced, the GUI enables the OK button. At that point, the user has customized the syntactically correct generic expression to become powerful filter records query. The methods of the present invention have allowed this expression to be built and customized without requiring any user knowledge of the associated rules of query syntax.

Both preferred embodiments of the present invention assist users in expression building. Users who are not proficient with the syntax rules associated with a database task can easily perform the desired task employing the methods of the present design. Users are provided with generic expressions and allowed to customize those expressions into powerful processing specifications or powerful queries.

While the invention has been particularly shown and described with reference to the preferred embodiments thereof, it will be understood by those skilled in the art that various changes in form and details may be made therein without departing from the spirit and scope of the invention.

What is claimed is:

1. A method for building syntactically correct expressions, said method comprising executing the following steps by a computer processor in the indicated sequential order:

providing a plurality of generic expressions, each of said plurality of genetic expressions including at least one genetic argument, allowing user selection of a generic expression of said plurality of generic expressions;

providing a plurality of specific arguments relating to said selected generic expression;

allowing user selection of a specific argument of said plurality of specific arguments relating to said selected generic expression;

allowing user selection of a generic argument of said at least one generic argument, for subsequent replacement of said generic argument in said selected generic expression with said selected specific argument, and replacing said selected generic argument in said selected generic expression with said selected specific argument.

2. The method of claim 1, further comprising the step of allowing user replacement of a relational operator in said selected generic expression.

3. The method of claim 1, further comprising the step of allowing the user to add generic arguments to said selected generic expression.

4. The method of claim 1, further comprising the step of allowing one of said plurality of generic expressions to be deleted from said selected generic expression.

5. The method of claim 1, further comprising the step of indicating completion of expression building by activating an OK selector, said OK selector activated only when all of said at least one generic arguments in said selected generic expression have been replaced by said selected specific arguments, wherein selection of said OK selector passes said selected generic expression to a data query tool.

6. The method of claim 1, wherein said step of allowing user selection of a specific argument of said plurality of specific arguments comprises the step of allowing user definition of a new constant.

7. The method of claim 1, wherein the step of allowing user selection of generic argument comprises activating a selector associated with said at least one generic argument.

8. The method of claim 1, further comprising the step of allowing one of said plurality of generic expressions to be appended to said selected generic expression.

9. The method of claim 8, wherein said generic expressions can be appended to said selected generic expression conjunctively.

10. The method of claim 1, wherein said step of providing a plurality of specific arguments includes the step of providing a category of specific arguments.

11. The method of claim 10, wherein said category of specific arguments comprises identifiers of fields in a data source.

12. The method of claim 10, wherein said category of specific arguments includes constants.

13. The method of claim 1, wherein each of said at least one generic argument has an associated data type, and wherein each of said plurality or specific arguments have an associated data type.

14. The method of claim 13, wherein said step of allowing user selection of a generic argument includes requiring that said data type associated with said generic argument matches said data type associated with said specific argument.

15. The method of claim 1, wherein the step of allowing user selection of a generic argument further comprises activating a selector that selects said generic argument.

16. A method for building syntactically correct processing specifications, said method comprising executing the following steps by a computer processor in the indicated sequential order:

providing a plurality of computed functions, each of said plurality of computed functions including at least one generic argument, each of said at least one generic arguments having an associated data type;

allowing user selection of a computed function of said plurality of computed functions;

allowing user selection of a specific argument category of a plurality of specific argument categories;

providing a plurality of specific arguments in said selected specific argument category, each of said plurality of specific arguments having an associated data type;

allowing user selection of a specific argument of said plurality of specific arguments;

conditionally allowing user selection of a generic argument of said at least one generic argument, for subsequent replacement of said at least one generic argument in said user-selected computed function with said selected specific argument, said user selection of said generic argument being allowed only if said data type associated with said selected specific argument matches said data type associated with said generic argument, and replacing said selected generic argument in said selected computed function with said user-selected specific argument.

17. The method of claim 16, further comprising the step of allowing user definition of new generic arguments in said user-selected computed function.

18. The method of claim 16, further comprising the step of allowing user definition of a new specific argument in said plurality of specific arguments.

19. The method of claim 16, wherein the step of providing a plurality of computed functions comprises selecting a category of computed functions, which displays a list of available computed functions.

20. The method of claim 16, further comprising the step of indicating completion of expression building by activating an OK selector, said OK selector activated only when all of said at least one generic arguments in said user-selected computed function have been replaced by said selected specific arguments, and wherein selection of said OK selector passes said user-selected computed function to a data query tool.

21. The method of claim 16, wherein the step of allowing user selection of a generic argument comprises the steps of displaying at least one argument selector corresponding to said at least one generic argument, and activating said argument selector when said data type of said generic argument matches said data type associated with said selected specific argument.

22. A method for building syntactically correct queries, said method comprising executing the following steps by a computer processor in the indicated sequential order:

providing a plurality of generic clause selectors, each of said generic clause selectors corresponding to a generic clause consisting of two generic arguments and a relational operator, each of said generic clause selectors facilitating user selection of at least one of said corresponding generic clauses;

displaying a selected generic clause in a text area;

providing a plurality of relational operator selectors, each of said relational operator selector facilitating user replacement of said relational operator in said selected generic clause in said text area;

displaying a plurality of specific arguments;

allowing user selection of a specific argument of said plurality of specific arguments;

allowing user selection of a generic argument of said two generic arguments, for subsequent replacement of said selected generic argument in said generic clause in said text area with said selected specific argument, and replacing said selected generic argument in said generic clause in said text area with a said selected specific argument.

23. The method of claim 22, further comprising the step of allowing user definition of new specific arguments in said plurality of displayed specific arguments.

24. The method of claim 22, wherein the step of displaying a plurality of specific arguments comprises displaying a plurality of specific argument categories.

25. The method of claim 22, wherein the step of allowing user selection of a specific argument comprises allowing user activation of one of two argument selectors, said argument selectors activatable when one of said plurality of specific arguments has been selected.

26. The method of claim 22, further comprising the step of allowing said selected generic clause to be deleted from said text area.

27. The method of claim 22, further comprising the step of indicating completion of expression building by activating an OK selector, said OK selector activated only when each of said two generic arguments in all of said at least one selected generic clause in said text area have been replaced by said selected specific arguments, and wherein selection of said OK selector passes said at least one selected genetic clauses clause in said text area to a data query tool.

28. A computer program product comprising a computer usable medium having a computer readable program code embodied therein for building syntactically correct expressions, said computer code adapted to have the followings steps executed in the indicated sequential order:

providing a plurality of generic expressions, each of said plurality of generic expressions including at least one generic argument;

allowing user selection of a generic expression of said plurality of generic expressions;

providing a plurality of specific arguments relating to said selected generic expression;

allowing user selection of a specific argument of said plurality of specific arguments relating to said selected generic expression;

allowing user selection of a generic argument of said at least one generic argument, for subsequent replacement of said selected generic argument in said selected generic expression with said selected specific argument, and replacing said selected generic argument in said selected generic expression with said selected specific argument.

29. The method of claim 28, further comprising the step of allowing user replacement of a relational operator in said selected generic expression.

30. The method of claim 28, further comprising the step of allowing the user to add generic arguments to said selected generic expression.

31. The method of claim 28, further comprising the step of allowing one of said plurality of generic expressions to be deleted from said selected generic expression.

32. The method of claim 28, further comprising the step of indicating completion of expression building by activating an OK selector, said OK selector activated only when all of said at least one generic arguments in said selected generic expression have been replaced by said selected specific arguments, wherein selection of said OK selector passes said selected generic expression to a data query tool.

33. The method of claim 28, wherein said step of allowing user selection or a specific argument of said plurality of specific arguments comprises the step of allowing user definition of a new constant.

34. The method of claim 28, wherein the step of allowing user selection of a generic argument comprises activating a selector associated with said at least one generic argument.

35. The method of claim 28, further comprising the step of allowing one of said plurality of generic expressions to be appended to said selected generic expression.

36. The method of claim 35, wherein said generic expressions can be appended to said selected generic expression conjunctively.

37. The method of claim 28, wherein said step of providing a plurality of specific arguments includes the step of providing a category of specific arguments.

38. The method of claim 37, wherein said category of specific arguments comprises identifiers of fields in a data source.

39. The method of claim 37, wherein said category of specific arguments includes constants.

40. The method of claim 28, wherein each of said at least one generic argument has an associated data type, and wherein each of said plurality or specific arguments have an associated data type.

41. The method of claim 40, wherein said step of allowing user selection of a generic argument includes requiring that said data type associated with said generic argument matches said data type associated with said specific argument.

42. The method of claim 28, wherein the step or allowing user selection of a generic argument further comprises activating a selector that selects said generic argument.

43. A computer program product comprising a computer usable medium having a computer readable program code embodied therein for building syntactically correct processing specifications, said computer code adapted to have the followings steps executed in the indicated sequential order:

providing a plurality of computed functions, each of said plurality of computed functions including at least one generic argument, each of said at least one generic arguments having an associated data type;

allowing user selection of a computed function of said plurality of computed functions;

allowing user selection of a specific argument category of a plurality of specific argument categories;

providing a plurality of specific arguments in said selected specific argument category, each of said plurality of specific arguments having an associated data type;

allowing user selection of a specific argument of said plurality of specific arguments;

conditionally allowing user selection of a generic argument of said at least one generic argument, for subsequent replacement of said at least one generic argument in said user-selected computed function with said selected specific argument, said user selection of said generic argument being allowed only if said data type associated with said selected specific argument matches said data type associated with said generic argument, and replacing said selected generic argument in said selected computed function with said user-selected specific argument.

44. The method of claim 43, further comprising the step of allowing user definition of new generic arguments in said user-selected computed function.

45. The method of claim 43, further comprising the step of allowing user definition of a new specific argument in said plurality, of specific arguments.

46. The method of claim 43, wherein the step of providing a plurality or computed functions comprises selecting a category of computed functions, which displays a list of available computed functions.

47. The method of claim 43, further comprising the step of indicating completion of expression building by activating an OK selector, said OK selector activated only when all of said at least one generic arguments in said user-selected computed function have been replaced by selected specific arguments, and wherein selection of said OK selector passes said user selected computed function to a data query tool.

48. The method of claim 43, wherein the step of allowing user selection of a generic argument comprises the steps of displaying at least one argument selector corresponding to said at least one generic argument, and activating said argument selector when said data type of said generic argument matches said data type associated with said selected specific argument.

49. A computer program product comprising a computer usable medium having a computer readable program code embodied therein for building syntactically correct queries, said computer code adapted to leave the followings steps executed in the indicated sequential order;
   providing a plurality of generic clause selectors, each of said generic clause selectors corresponding to a generic clause consisting of two generic arguments and a relational operator, each of said generic clause selectors facilitating user selection of at least one of said corresponding generic clauses;
   displaying a selected generic clause in a text area;
   providing a plurality of relational operator selectors, each said relational operator selector facilitating user replacement of said relational operator in said selected generic gauzes clause in said text area;
   displaying a plurality or specific arguments;
   allowing user selection of a specific argument of said plurality of specific arguments; and
   allowing user selection of a generic argument of said two generic arguments, for subsequent replacement of said selected generic argument in said generic clause in said text area with said selected specific argument, and
   replacing said selected generic argument in said generic clause in said text area with said selected specific argument.

50. The method of claim 49, further comprising the step of allowing user definition of new specific arguments in said plurality of displayed specific arguments.

51. The method of claim 49, wherein the step of displaying a plurality of specific arguments comprises displaying a plurality of specific argument categories.

52. The method of claim 49, wherein the step of facilitating user replacement of said at least one generic argument in said generic clause in said text area with a selected specific argument allowing user selection of a specific argument comprises allowing user activation of one of two argument selectors, said argument selectors activatable when one of said plurality of specific arguments has been selected.

53. The method of claim 49, further comprising the step of allowing said selected generic clauses clause to be deleted from said text area.

54. The method of claim 49, further comprising tile step of indicating completion of expression building by activating an OK selector, said OK selector activated only when each of said two generic arguments in all of said at least one selected generic clause in said text area have been replaced by said selected specific arguments, and wherein selection of said OK selector passes said at least one selected generic clause in said text area to a data query tool.

* * * * *

UNITED STATES PATENT AND TRADEMARK OFFICE
CERTIFICATE OF CORRECTION

PATENT NO. : 6,671,691 B1  Page 1 of 1
DATED : December 30, 2003
INVENTOR(S) : Joseph Phillip Bigus It is certified that error appears in the above-identified patent and that said Letters Patent is hereby corrected as shown below:

Column 20,
Lines 56 and 57, "genetic" should be -- generic --.

Column 25,
Line 27, "generic gauzes clause" should be -- generic clause --.
Line 28, "or" should be -- of --.

Signed and Sealed this

Ninth Day of March, 2004

JON W. DUDAS
*Acting Director of the United States Patent and Trademark Office*